(12) United States Patent
Saito

(10) Patent No.: US 10,819,193 B2
(45) Date of Patent: Oct. 27, 2020

(54) DRIVE UNIT FOR ICE MAKING DEVICE AND ICE MAKING DEVICE

(71) Applicant: NIDEC SANKYO CORPORATION, Nagano (JP)

(72) Inventor: Shunji Saito, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 141 days.

(21) Appl. No.: 16/116,938

(22) Filed: Aug. 30, 2018

(65) Prior Publication Data

US 2019/0068032 A1    Feb. 28, 2019

(30) Foreign Application Priority Data

Aug. 31, 2017 (JP) .................. 2017-166790

(51) Int. Cl.
*H02K 11/33* (2016.01)
*F25C 5/04* (2006.01)
(Continued)

(52) U.S. Cl.
CPC ................ *H02K 11/33* (2016.01); *F25C 1/10* (2013.01); *F25C 5/04* (2013.01); *F25C 5/06* (2013.01);
(Continued)

(58) Field of Classification Search
CPC .......... F25C 1/10; F25C 5/06; F25C 2700/12; F25C 2305/022; H02K 11/33; H02K 7/116; H02K 2211/03
See application file for complete search history.

(56) References Cited

U.S. PATENT DOCUMENTS 5,596,182 A * 1/1997 Edwards .................. F25C 1/04
                                                    200/38 R
9,175,892 B2 * 11/2015 Saito ...................... F25C 5/187
(Continued)

FOREIGN PATENT DOCUMENTS

| CN | 1601210 | 3/2005 |
| CN | 2701101 | 5/2005 |

(Continued)

OTHER PUBLICATIONS

"Office Action of China Counterpart Application", dated Jun. 11, 2020, with English translation thereof, pp. 1-21.

*Primary Examiner* — Kun Kai Ma
(74) *Attorney, Agent, or Firm* — JCIPRNET

(57) ABSTRACT

A drive unit for an ice making device includes a drive mechanism, a circuit board structured to perform at least one of power feeding to and control for the drive mechanism, and a case in which the drive mechanism and the circuit board are disposed on an inner side. The case comprises a first end plate part, a second end plate part which faces the first end plate part, and a partition member which sections a space between the first end plate part and the second end plate part. The circuit board is disposed in a circuit board arrangement chamber provided between the first end plate part and the partition member. The drive mechanism is disposed in a drive chamber provided between the second end plate part and the partition member, and a plurality of support posts is provided between the first end plate part and the partition member.

14 Claims, 17 Drawing Sheets

(51) Int. Cl.
  *F25C 5/20*  (2018.01)
  *F25C 1/10*  (2006.01)
  *F25C 5/06*  (2006.01)
  *H02K 7/116*  (2006.01)

(52) U.S. Cl.
  CPC ............... *F25C 5/20* (2018.01); *H02K 7/116* (2013.01); *F25C 2305/022* (2013.01); *H02K 2211/03* (2013.01)

(56) References Cited

U.S. PATENT DOCUMENTS

| | | | | |
|---|---|---|---|---|
| 2007/0068189 | A1* | 3/2007 | Villani | F25C 1/045 62/353 |
| 2008/0237000 | A1* | 10/2008 | Maehara | F25D 29/005 200/19.21 |
| 2014/0360219 | A1* | 12/2014 | Lee | F25C 1/04 62/353 |
| 2015/0276295 | A1* | 10/2015 | Barrena | F25C 1/00 62/135 |
| 2015/0345851 | A1* | 12/2015 | Ramirez, Jr. | F25C 1/10 62/72 |
| 2017/0373558 | A1* | 12/2017 | Ramirez, Jr. | H02K 5/22 |

FOREIGN PATENT DOCUMENTS

| | | |
|---|---|---|
| CN | 102549358 | 7/2012 |
| FR | 2742850 | 6/1997 |

* cited by examiner

DRIVE UNIT FOR ICE MAKING DEVICE AND ICE MAKING DEVICE

CROSS REFERENCE TO RELATED APPLICATION

The present invention claims priority under 35 U.S.C. § 119 to Japanese Application No. 2017-166790 filed Aug. 31, 2017, the entire content of which is incorporated herein by reference.

TECHNICAL FIELD

The present invention relates to a drive unit for an ice making device in which a drive mechanism and a circuit board are disposed in a case, and an ice making device.

BACKGROUND

An ice making device which is mounted on a refrigerator includes an ice tray whose water storage recessed parts are disposed upward and a drive unit. For example, the drive unit drives the ice tray so as to reverse around an axial line extended in a direction intersecting an upper and a lower direction and to perform a twisting operation and thereby an ice separation from the ice tray is performed. On the other hand, a geared motor has been proposed as the drive unit in which a first case member, a second case member (partition member) and a third case member are disposed in an overlapped manner from one side in a thickness direction of a case. A control circuit board is disposed between the first case member and the second case member and the drive mechanism is disposed between the second case member and the third case member (see, Patent Literature 1: US 2015/0345851).

However, when the ice tray is performed with a reversing operation and an ice separating operation, the case is subjected to a reaction force from the ice tray and thus, in the drive unit described in Patent Literature 1, the case may be distorted to easily incur malfunction in operation.

SUMMARY

In view of the problem described above, an objective of the present invention is to provide a drive unit for an ice making device in which strength of a case of the drive unit is increased and to provide an ice making device.

To achieve the above mentioned objective, the present invention provides a drive unit for an ice making device including a drive mechanism, a circuit board structured to perform at least one of power feeding to and control for the drive mechanism, and a case in which the drive mechanism and the circuit board are disposed on an inner side. The case includes a first end plate part which is located on one side in a thickness direction of the case, a second end plate part which faces the first end plate part on the other side in the thickness direction, and a partition member which sections a space between the first end plate part and the second end plate part in the thickness direction. The circuit board is disposed in a circuit board arrangement chamber which is provided between the first end plate part and the partition member, the drive mechanism is disposed in a drive chamber which is provided between the second end plate part and the partition member, and a plurality of support posts is provided between the first end plate part and the partition member.

In the drive unit for an ice making device in accordance with the present invention, the circuit board is disposed in a circuit board arrangement chamber which is provided between the first end plate part and the partition member, and the drive mechanism is disposed in a drive chamber which is provided between the second end plate part and the partition member. Therefore, grease applied to the drive mechanism in the drive chamber and water entered into the drive chamber are hard to be stuck to the circuit board. Further, the circuit board arrangement chamber (first end plate part and partition member) is reinforced by the support posts. Therefore, the strength of the case of the drive unit can be increased and thus the case is capable of withstanding a reaction force when an ice separating operation is performed. In this case, it may be structured that the drive mechanism includes a motor, a gear transmission mechanism to which a rotating force of the motor is transmitted, and a cam gear to which the rotating force of the motor is transmitted through the gear transmission mechanism, and the cam gear includes an output shaft which is protruded from the second end plate part to an outer side of the second end plate part and is connected with an ice tray and, when an ice separating operation of ice pieces of the ice tray is to be performed, the output shaft is turned by the motor and the ice tray is reversed.

In the present invention, it may be structured that each of the plurality of the support posts is comprised of a first pillar shaped part protruded from the first end plate part toward the partition member and a second pillar shaped part protruded from the partition member toward the first pillar shaped part, and the circuit board is supported between the first pillar shaped part and the second pillar shaped part. In this case, it may be structured that some of the first pillar shaped parts are provided in an outer peripheral part of the first end plate part, and the circuit board is supported between the first pillar shaped part and the second pillar shaped part. According to this structure, a strength of the entire first end plate part can be increased by a plurality of the first pillar shaped parts provided in the outer peripheral part, and the circuit board is supported between the first pillar shaped part and the second pillar shaped part and thus a strength of the first end plate part can be also increased by the circuit board.

In the present invention, it may be structured that one of the first pillar shaped part and the second pillar shaped part is provided with a protruded part which is protruded from its tip end part, and the other of the first pillar shaped part and the second pillar shaped part is provided with a hole which is opened in its tip end part into which the protruded part is fitted.

In the present invention, it may be structured that the circuit board is supported between the first pillar shaped part and the second pillar shaped part in a state that the protruded part is penetrated through an opening part formed in the circuit board and is fitted into the hole. According to this structure, the circuit board can be supported by utilizing the support post.

In the present invention, it may be structured that the other pillar shaped part is provided with a plurality of projection parts on its the tip end part, and the other pillar shaped part is contacted with the circuit board in a state that at least one of a portion of the circuit board where the plurality of the projection parts are abutted and the plurality of the projection parts is partly crushed. According to this structure, variations of height dimensions of the first pillar shaped part and the second pillar shaped part can be absorbed by the circuit board or a crushing extent of the projection part and thus the circuit board can be supported appropriately.

In the present invention, it may be structured that the circuit board includes a first circuit board supported by some of the plurality of the support posts, and a second circuit board supported by another some of the plurality of the support posts.

In the present invention, it may be structured that the first circuit board is supported by three of the plurality of the support posts, and the second circuit board is supported by another three of the plurality of the support posts. According to this structure, even if height dimensions of the first pillar shaped part and the second pillar shaped part are varied in the plurality of the support posts, each of the first circuit board and the second circuit board can be appropriately supported.

In the present invention, it may be structured that the partition member is provided with a penetration part which is penetrated through the partition member in a thickness direction, and the drive chamber and the circuit board arrangement chamber are electrically connected with each other through the penetration part.

In the present invention, it may be structured that the case includes a first case member which structures the first end plate part, a second case member which structures the partition member, and a third case member which structures the second end plate part toward one side in a thickness direction.

The present invention may be further effectively applied to an ice making device including the drive unit described above in which a reversing operation and a twisting operation interlocked with the reversing operation are performed on an ice tray by the drive mechanism. In this case, the ice making device includes the drive unit, an ice tray provided with a plurality of water storage recessed parts, and a frame which turnably supports the ice tray and on which the drive unit is mounted, and a reversing operation and a twisting operation interlocked with the reversing operation are performed on the ice tray by the drive mechanism. In this case, the drive unit is subjected to a large reaction force from the ice tray when an ice separating operation is performed. However, according to the present invention, the case is capable of withstanding the reaction force.

In the present invention, it may be structured that the case includes a first case member which structures the first end plate part, a second case member which structures the partition member, and a third case member which structures the second end plate part toward one side in the thickness direction, and the first case member, the second case member and the third case member are connected with each other with a screw to be mounted on the frame.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 14 is a perspective view showing a terminal holder in FIG. 11 and the like.

DETAILED DESCRIPTION

An embodiment of the present invention will be described below with reference to the accompanying drawings. In the following descriptions, three directions intersecting each other are referred to as a first direction "X" (longitudinal direction), a second direction "Y" (width direction), and a third direction "Z" (upper and lower direction). Further, "X1" is indicated on one side in the first direction "X", "X2" is indicated on the other side in the first direction "X", "Y1" is indicated on one side in the second direction "Y", "Y2" is indicated on the other side in the second direction "Y", "Z1" is indicated on one side (upper side) in the third direction "Z" (upper and lower direction), and "Z2" is indicated on the other side (lower side) in the third direction "Z" (upper and lower direction).

(Entire Structure)

Figure 1:
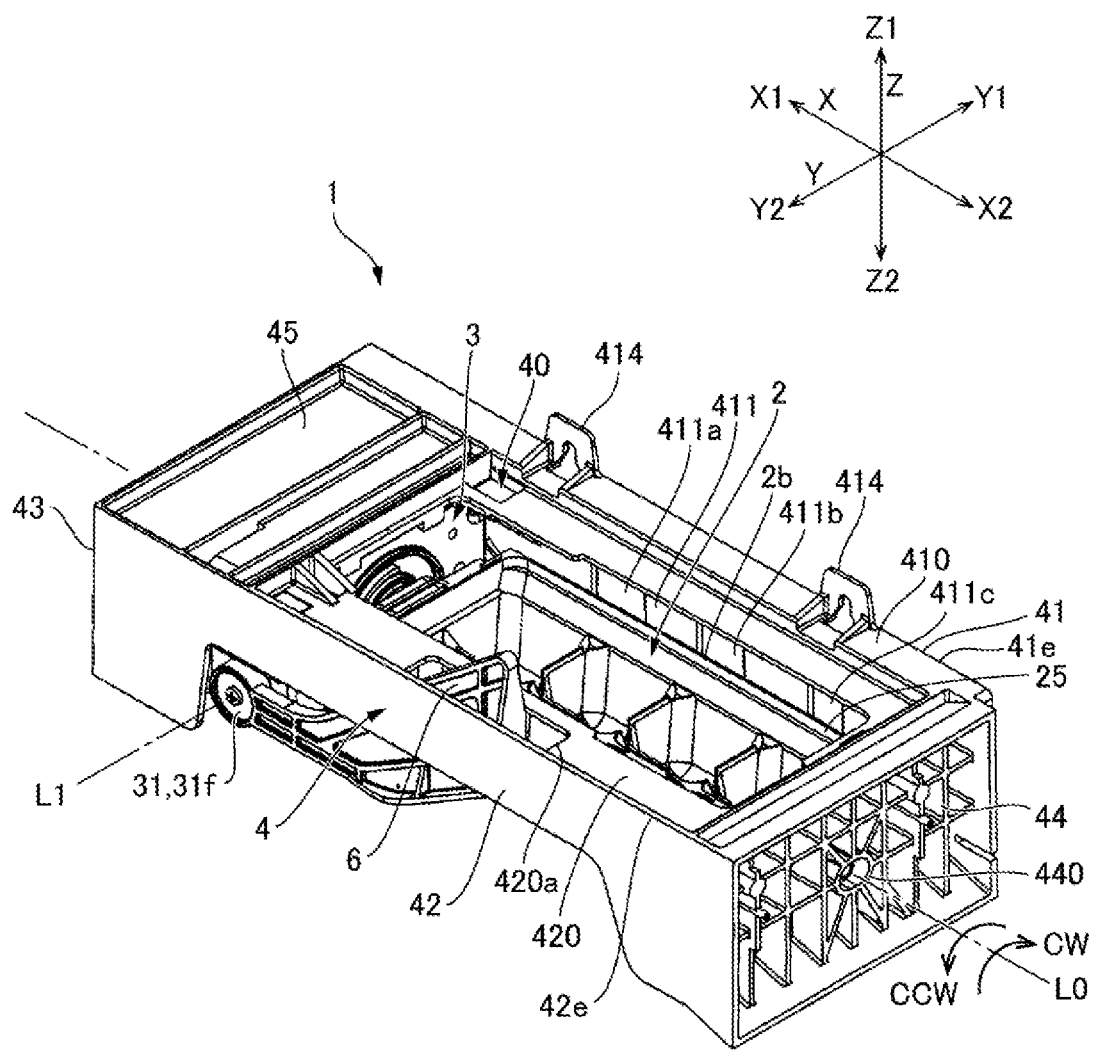
FIG. 1 is a perspective view showing an ice making device which is viewed from a side of a second side plate part and from an obliquely upper side in accordance with an embodiment of the present invention.
Figure 2:
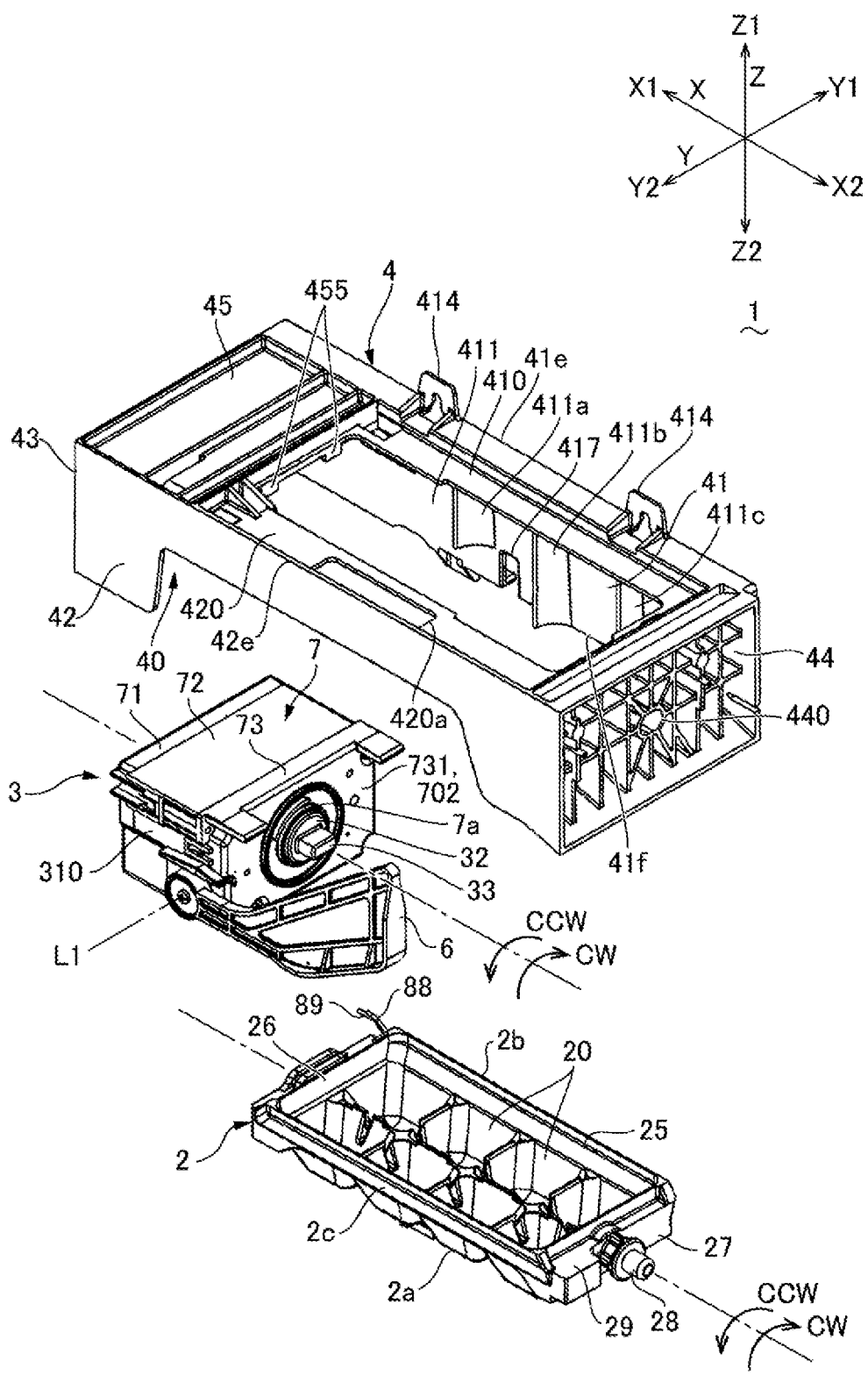
FIG. 2 is an exploded perspective view showing the ice making device shown in FIG. 1 which is viewed from a side of a second side plate part and from an obliquely upper side.
Figure 3:
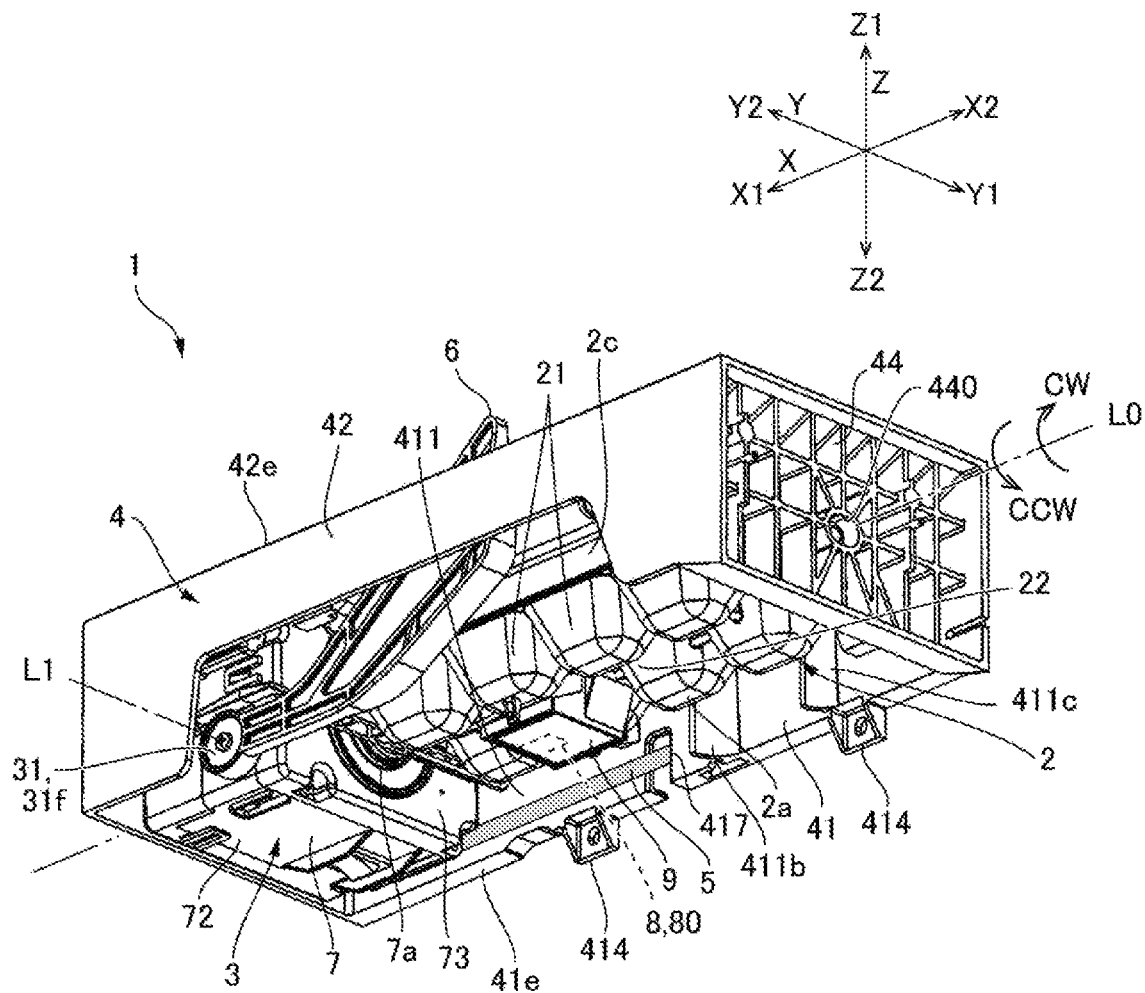
FIG. 3 is a perspective view showing the ice making device shown in FIG. 1 which is viewed from a side of a second side plate part and from an obliquely lower side.

FIG. 1 is a perspective view showing an ice making device 1 which is viewed from a side of a second side plate part 42 and from an obliquely upper side in accordance with an embodiment of the present invention. FIG. 2 is an exploded perspective view showing the ice making device 1 shown in FIG. 1 which is viewed from a side of the second side plate part 42 and from an obliquely upper side. FIG. 3 is a perspective view showing the ice making device 1 shown in FIG. 1 which is viewed from a side of the second side plate part 42 and from an obliquely lower side.

The ice making device 1 shown in FIGS. 1 through 3 includes an ice tray 2 whose water storage recessed parts 20 (cells) are disposed toward one side "Z1" (upper side) in the third direction "Z", a drive unit 3 (drive unit for an ice making device) which is disposed on one side "X1" in the first direction "X" with respect to the ice tray 2, and a frame 4 provided with a mounting part 40 on which the drive unit 3 is mounted. The ice making device 1 is mounted on a refrigerator main body (not shown) of a refrigerator and, in the refrigerator, water in a water tank (not shown) is supplied to the water storage recessed parts 20 of the ice tray 2 through a water supply pipe (not shown) and an ice making is performed. When ice making is completed, the drive unit 3 drives the ice tray 2 as an ice separating operation to perform a reversing operation around an axial line "L0" (first axial line) extended in the first direction "X" and a twisting operation interlocked with the reversing operation and, as a result, ice pieces of the ice tray 2 are dropped to an ice storage container (not shown). A water supply pipe may be directly connected with a faucet of water service.

(Structure of Ice Tray 2)

The ice tray 2 is a mechanical member which is molded with a resin material so that its planar shape is a substantially quadrangle and the material is structured to be capable of being elastically deformed. In the ice tray 2, a plurality of water storage recessed parts 20 are arranged in the first direction "X" and the second direction "Y". For example, two water storage recessed parts 20 are arranged as a pair in the second direction "Y" and four pairs are disposed in the first direction "X" on an inner side of a frame part 25 of the ice tray 2 formed in a substantially quadrangular shape. In the frame part 25 of the ice tray 2, a wall part 26 located on one side "X1" in the first direction "X" is formed with a connecting part (not shown) which is connected with an output shaft 33 of the drive unit 3 on an axial line "L0", and a wall part 27 located on the other side "X2" in the first direction "X" is formed with a shaft part 28 which is turnably supported by the frame 4 on the axial line "L0". The wall part 27 of the ice tray 2 is formed with a turning restriction part 29 which is abutted with the frame 4 when the ice tray 2 is turned around the axial line "L0", and the turning restriction part 29 prevents turning of the ice tray 2 to make the ice tray 2 perform a twisting operation.

An under face 2a of the ice tray 2 located on the other side "Z2" in the third direction "Z" is arranged with a plurality of protruded parts 21 reflecting shapes of the plurality of the water storage recessed parts 20. The under face 2a of the ice tray 2 is disposed with a temperature sensor 8 structured to detect a temperature of the ice tray 2, and the temperature sensor 8 is covered by a cover member 9 which is fixed to the under face 2a of the ice tray 2. Signal wiring lines 88 and 89 are extended from the temperature sensor 8 toward an inside of the drive unit 3. In this embodiment, the temperature sensor 8 is a thermistor 80.

(Structure of Frame 4 and the Like)

The frame 4 is provided with a first side plate part 41 which is extended in the first direction "X" along a first side face 2b on one side "Y1" in the second direction "Y" of the ice tray 2, and a second side plate part 42 which is extended in the first direction "X" along a second side face 2c on the other side "Y2" in the second direction "Y" of the ice tray 2. The first side plate part 41 and the second side plate part 42 are faced in parallel to each other in the second direction "Y". An ice detection lever 6 whose base end side is connected with the drive unit 3 is disposed between the second side plate part 42 and the ice tray 2.

A first upper plate part 410 is projected toward the second side plate part 42 from an upper end 41e of the first side plate part 41 (edge on one side "Z1" in the third direction "Z"). The first upper plate part 410 is bent to a lower side at a midway position toward the other side "Y2" in the second direction "Y" and then is projected toward the second side plate part 42. A second upper plate part 420 is projected from the vicinity of the upper end 42e of the second side plate part 42 (an edge on one side "Z1" in the third direction "Z") toward the first side plate part 41. The ice tray 2 is set in an opened state facing toward an upper side (one side "Z1" in the third direction "Z") between the first upper plate part 410 and the second upper plate part 420. The second upper plate part 420 is formed with an opening part 420a in which an upper end part of the ice detection lever 6 is located on its inner side.

End parts of the first side plate part 41 and the second side plate part 42 on one side "X1" in the first direction "X" are overlapped with the drive unit 3 when viewed in the second direction "Y". The first side plate part 41 and the second side plate part 42 are connected with each other by a first wall part 43 in a plate shape, which is located at an end part on one side "X1" in the first direction "X", and a second wall part 44 located at an end part on the other side "X2" in the first direction "X". The first side plate part 41 and the second side plate part 42 are also connected with each other by an upper plate part 45 covering the drive unit 3 from an upper side on one side "X1" in the first direction "X". Therefore, in this embodiment, a space surrounded by the first side plate part 41, the second side plate part 42, the first wall part 43 and the upper plate part 45 of the frame 4 is structured to be a mounting part 40 for the drive unit 3. The mounting part 40 is structured as an opened state toward a lower side (the other side "Z2" in the third direction "Z"). The second wall part 44 is a wall provided with a plurality of holes which are structured by a plurality of ribs in a plate shape connected with each other. A shaft hole 440 is formed at the center so as to turnably support the shaft part 28 of the ice tray 2.

In the first side plate part 41, a plurality of reinforcing ribs 411a, 411b and 411c are formed so as to be extended in an upper and a lower direction on a wall (inner wall 411) on a side where the ice tray 2 is located. In a wall (outer wall) of the first side plate part 41 on an opposite side to the ice tray 2, an upper end 41e and a lower end 41f of the first side plate part 41 are formed with a plurality of attaching parts 414 on the other side "X2" in the first direction "X" with respect to the drive unit 3 for fixing the frame 4 to a refrigerator main body (not shown) when the ice making device 1 is to be mounted on the refrigerator main body. The lower end 41f of the first side plate part 41 is formed with a cut-out part 417 between the attaching parts 414 adjacent to each other in the first direction "X". A wiring line 5 structured to supply electrical power to the drive unit 3 is extended from the drive unit 3 along the inner wall 411 of the first side plate part 41 toward the other side "X2" in the first direction "X" and then is extended outside through the cut-out part 417.

Therefore, when the drive unit 3 is going to make the ice tray 2 perform a twisting operation in order to perform an ice separating operation, even in a case that a large force is applied to the frame 4 due to its reaction force, a transmission of the force to the side of the cut-out part 417 of the first side plate part 41 is restrained by the attaching part 414 which is fixed to the refrigerator main body on one side "X1" in the first direction "X" with respect to the cut-out part 417. Accordingly, stress can be restrained from being concentrated on the cut-out part 417 and the like in the first side plate part 41 and thus the first side plate part 41 can be restrained from being damaged in the vicinity of the cut-out part 417.

(Structure of Drive Unit 3)

Figure 4:
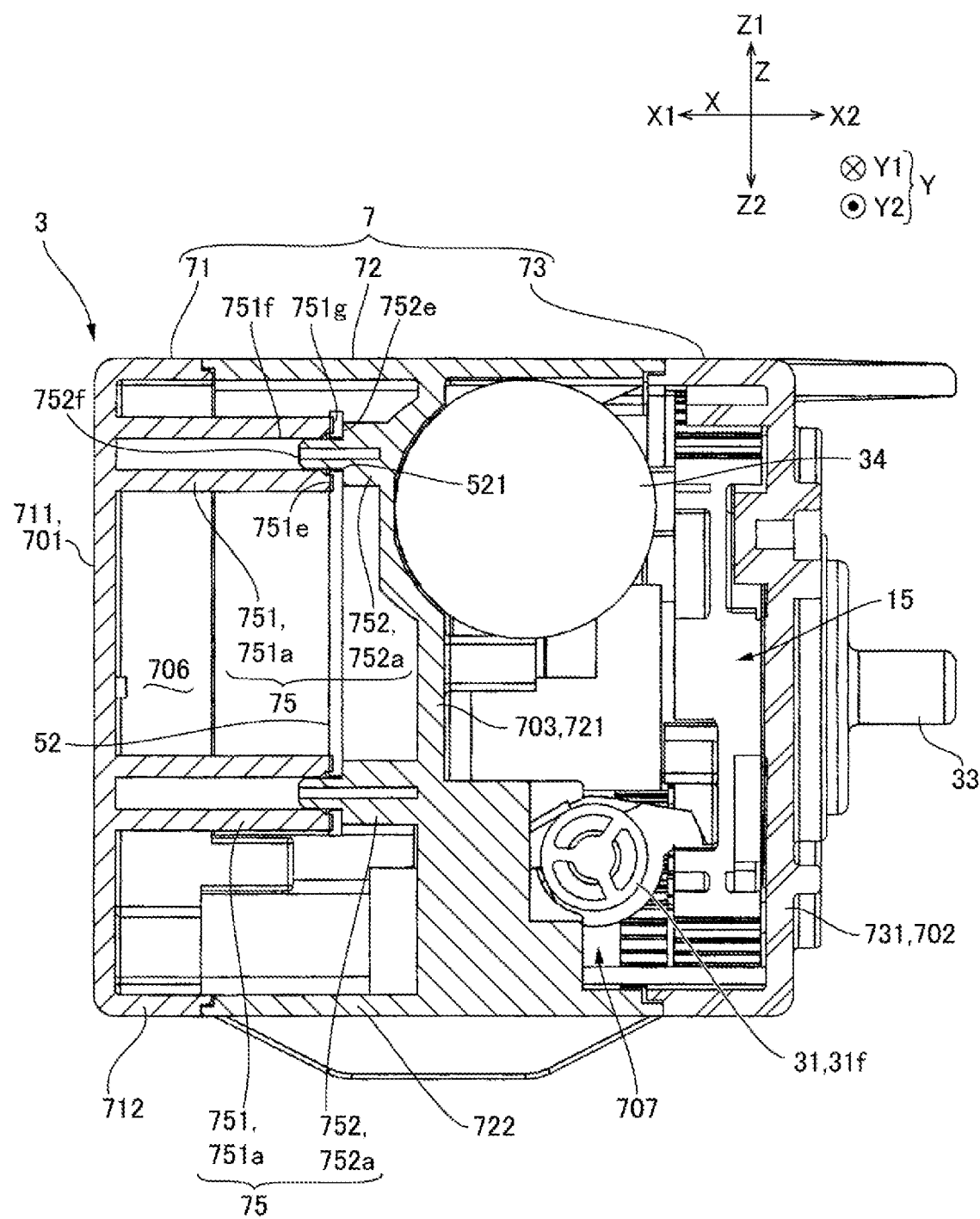
FIG. 4 is an "XZ" cross-sectional view showing a drive unit in FIG. 2.
Figure 5:
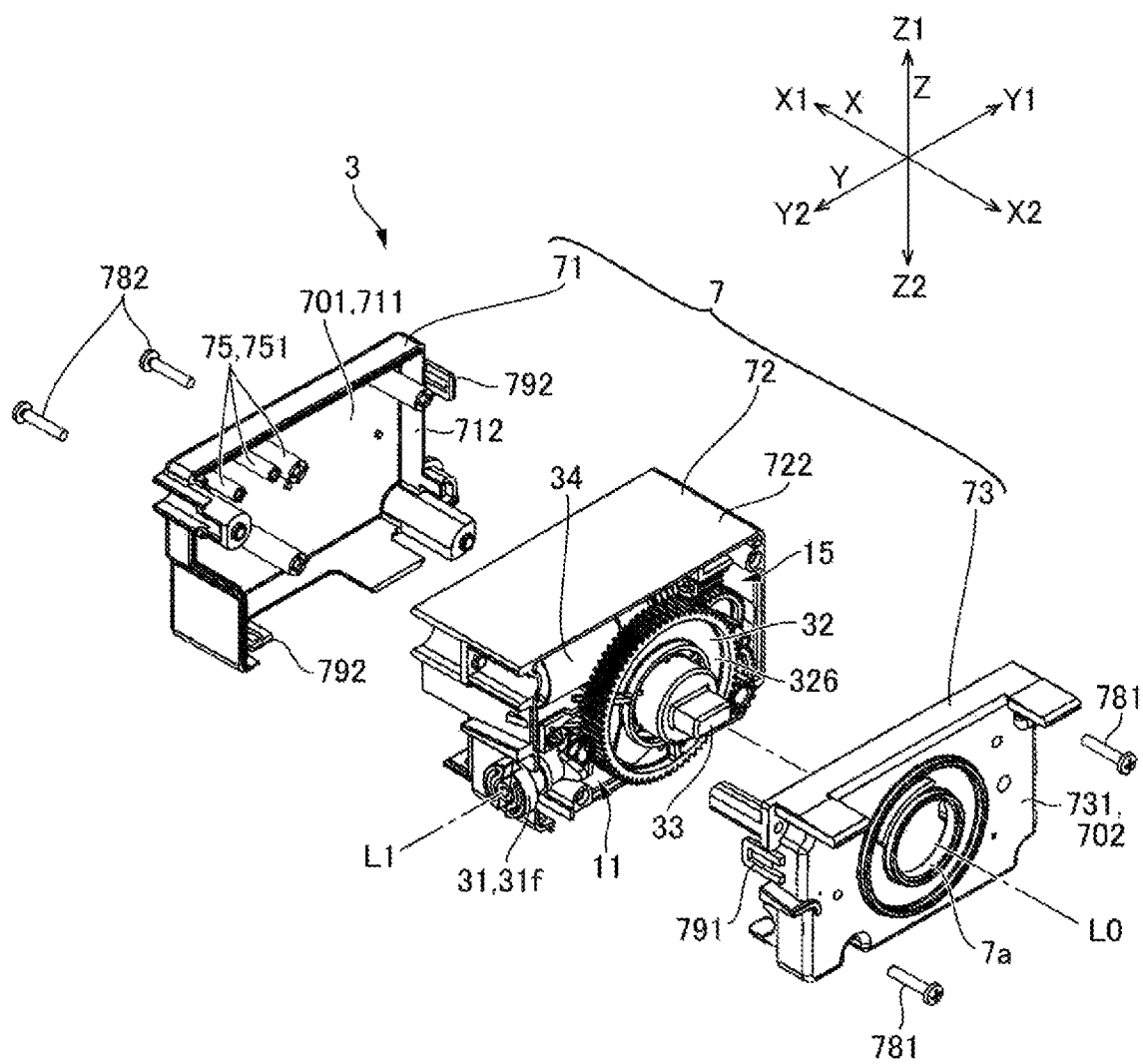
FIG. 5 is an exploded perspective view showing a state that the drive unit shown in FIG. 2 is disassembled and viewed from a side of an ice tray.
Figure 6:
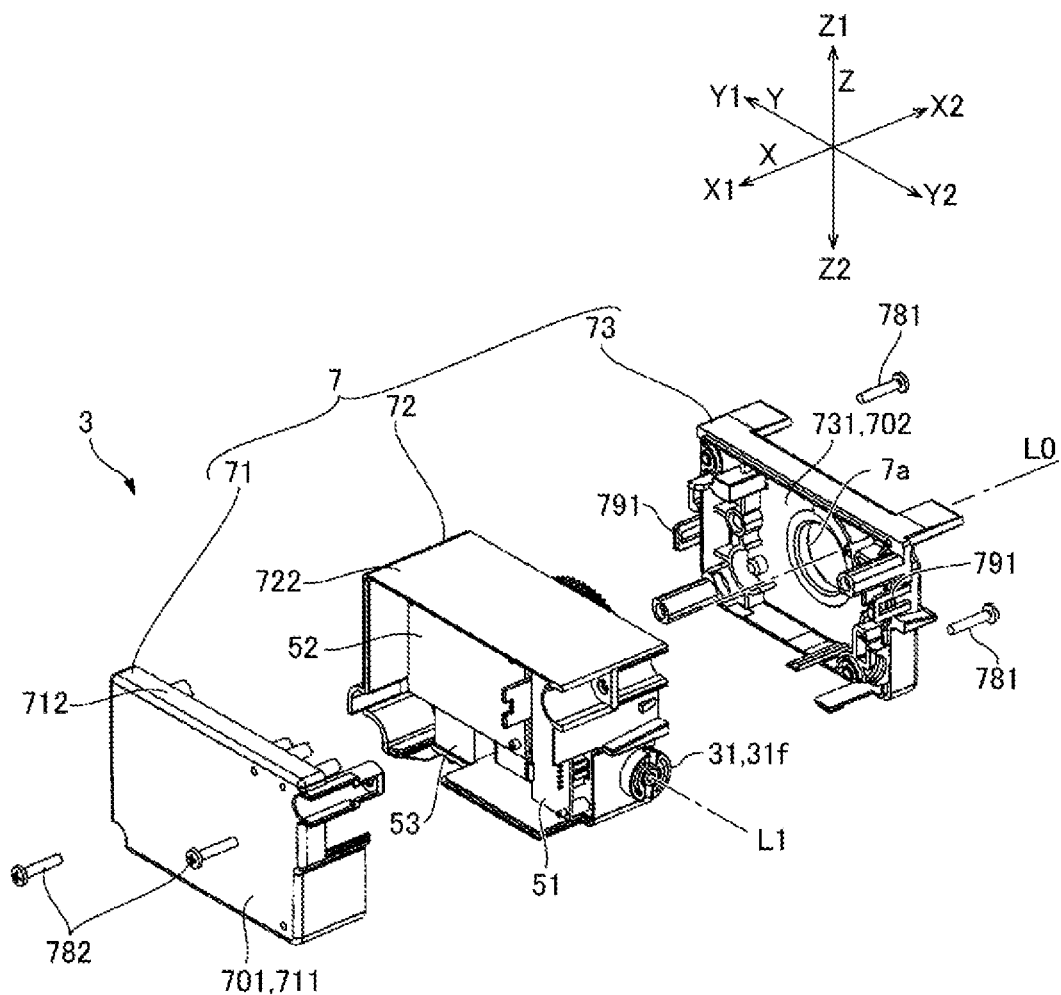
FIG. 6 is an exploded perspective view showing a state that the drive unit shown in FIG. 2 is disassembled and viewed from an opposite side to an ice tray.

FIG. 4 is an "XZ" cross-sectional view showing the drive unit 3 in FIG. 2 and shows a state that the drive unit 3 is cut at a position passing support posts 75. FIG. 5 is an exploded perspective view showing a state that the drive unit 3 shown in FIG. 2 is disassembled and viewed from a side of the ice tray 2. FIG. 6 is an exploded perspective view showing a state that the drive unit 3 shown in FIG. 2 is disassembled and viewed from an opposite side to the ice tray 2.

In FIG. 2, the drive unit 3 is structured so that a drive mechanism 15 (see FIG. 7) for driving an output shaft 33 is disposed on an inner side of a case 7 which is molded in a rectangular parallelepiped shape. In the drive mechanism 15, a rotating force of a drive source is transmitted to a cam gear 32 through a gear transmission mechanism, and the cam gear 32 is integrally molded and provided with the output shaft 33 with which the ice tray 2 is connected. The output shaft 33 is protruded to an outer side of the case 7 through a hole 7a of the case 7 (specifically, the second end plate part 702 described below). When ice pieces of the ice tray 2 are to be separated from the ice tray 2, the output shaft 33 turns the ice tray 2 in a counterclockwise "CCW" direction with the axial line "L0" as a center to reverse the ice tray 2 and, when the ice tray 2 is to be returned to the original position, the output shaft is turned in a clockwise CW direction.

The ice detection lever 6 is disposed at a position adjacent to the ice tray 2 on the other side "Y2" in the second direction "Y". The drive unit 3 is structured with an ice detection mechanism 11 (see FIG. 7) which is interlocked with the cam gear 32 to turn the ice detection lever 6 around an axial line "L1" (second axial line), a switch mechanism into which a signal from the temperature sensor 8 is inputted through the signal wiring lines 88 and 89 described with reference to FIG. 3, and the like. The ice detection mechanism 11 is a mechanism structured to detect whether an amount of ice pieces in an ice storage container is full or insufficient. In a case that the ice detection lever 6 is moved downward to an inside of the ice storage container, when the ice detection lever 6 is moved lower than a predetermined position, it is determined that ice pieces are insufficient.

In FIGS. 4, 5 and 6, the case 7 includes a first end plate part 701, which is located on one side (one side "X1" in the first direction "X") in the axial line "L0" direction (thickness direction of the case 7), a second end plate part 702 which faces the first end plate part 701 on the other side in the axial line "L0" direction (the other side "X2" in the first direction "X"), and a partition member 703 which sections a space between the first end plate part 701 and the second end plate part 702 in the axial line "L0" direction (first direction "X"). Therefore, a circuit board arrangement chamber 706 is sectioned on one side "X1" in the first direction "X" between the first end plate part 701 and the second end plate part 702 by the partition member 703. The circuit board arrangement chamber 706 is disposed with a first circuit board 51 for power feeding on which an AC-DC converter and the like are structured, a second circuit board 52 for control and a power switch 53.

In this embodiment, the case 7 includes a first case member 71 made of resin, a second case member 72 made of resin and a third case member 73 made of resin which are disposed so as to be overlapped with each other from one side "X1" in the first direction "X" (a thickness direction of the case 7) to the other side "X2" in this order. The first end plate part 701 is structured with a bottom plate part 711 of the first case member 71, the second end plate part 702 is structured with a bottom plate part 731 of the third case member 73, and the partition member 703 is structured by a bottom plate part 721 of the second case member 72. The second case member 72 and the third case member 73 are connected with each other by screws 781 and a frame-shaped protruded part 791, and the first case member 71 and the second case member 72 are connected with each other by a frame-shaped protruded part 792. Further, the first case member 71, the second case member 72 and the third case member 73 are connected with each other by screws 782.

(Structure of Drive Mechanism 15)

Figure 7:
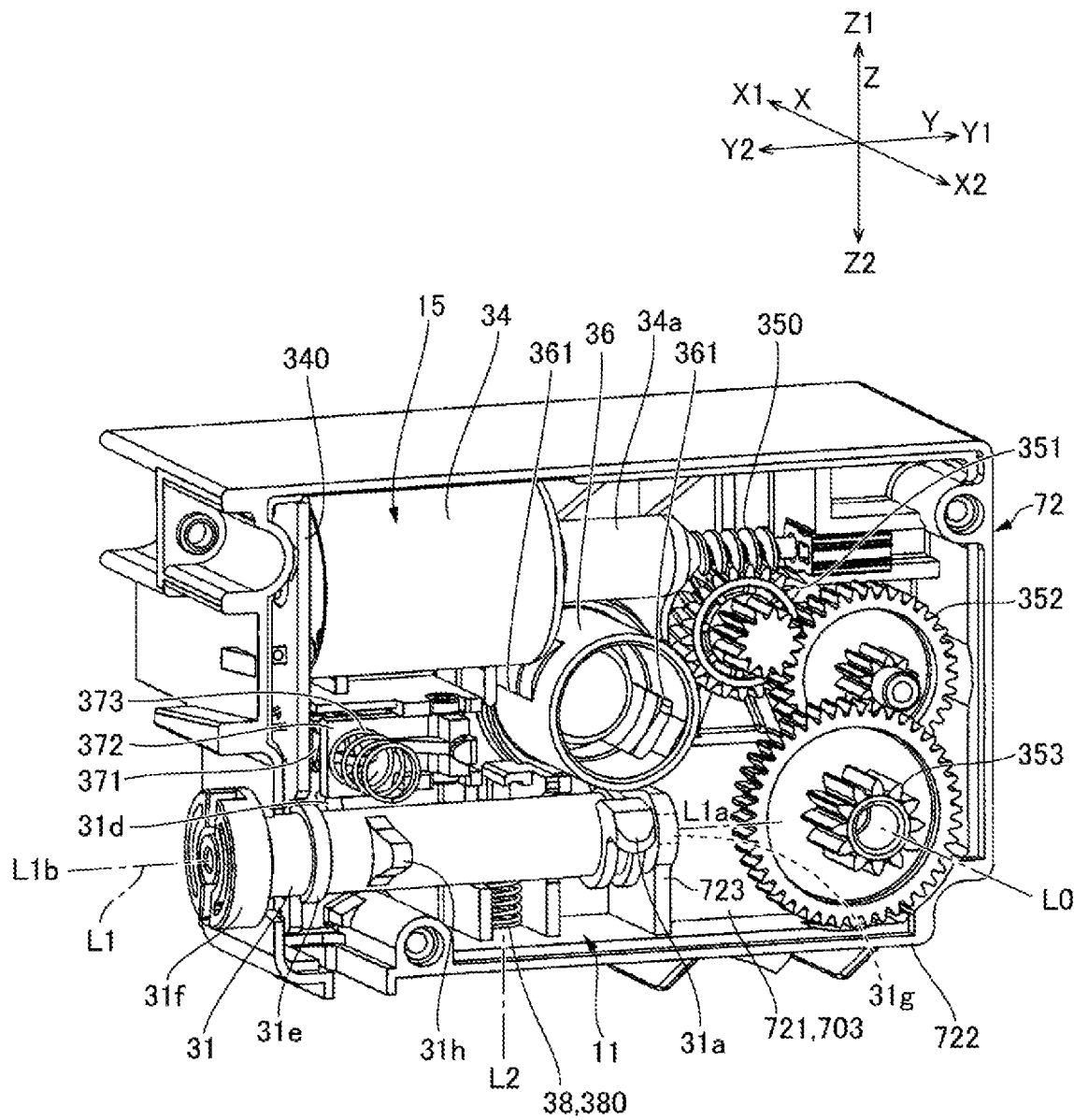
FIG. 7 is a perspective view showing a drive mechanism in FIG. 5.

FIG. 7 is a perspective view showing the drive mechanism 15 in FIG. 5 and shows a state that the cam gear 32 is detached. As shown in FIGS. 5 and 7, the second case member 72 is provided with a bottom plate part 721 in a substantially quadrangular shape and a body part 722 in a rectangular tube shape which is protruded from an outer side edge of the bottom plate part 721 to one side "X1" and the other side "X2" in the first direction "X". In the second case member 72, the drive mechanism 15 is provided on an inner side of the body part 722 on the other side "X2" in the first direction "X" with respect to the bottom plate part 721. The drive mechanism 15 includes a motor 34 as a drive source, and a motor circuit board 340 is fixed on an opposite-to-output side of a body part of the motor 34 (a face of the motor 34 on the other side "Y2" in the second direction "Y"). The motor 34 is a DC motor, and rotation of the motor 34 is decelerated and transmitted to the cam gear 32 through a worm gear 350 connected with a motor shaft 34a of the motor 34, a first gear 351, a second gear 352 and a third gear 353. A face of the cam gear 32 facing the third case member 73 is formed with a groove 326 along a circumferential direction, and a projection (not shown) formed in the third case member 73 is inserted into the groove 326 to restrict a turnable angular range of the cam gear 32.

In this embodiment, the cam gear 32 is controlled so as to turn in a reverse direction based on a first signal output and a drive time period after an ice detection operation is started. Therefore, in an ice full state, it is controlled that the motor 34 is stopped when the cam gear 32 has been turned, for example, by 42 degrees, and then, the motor 34 is rotated in the reverse direction. Further, in a case that ice pieces are insufficient, the motor 34 is stopped when the cam gear 32 has been turned, for example, by 160 degrees, and then, the motor 34 is rotated in the reverse direction.

The cam gear 32 is integrally molded with the output shaft 33 so as to protrude to one side "X1" and to the other side "X2" in the first direction "X". A pressing type switch 371, a switch pressing lever 372 and a coil spring 373 are disposed in an overlapped manner on a side of the cam gear 32. The switch pressing lever 372 is urged toward the pressing type switch 371 by the coil spring 373. The pressing type switch 371 becomes either on or off in order to distinguish an insufficient state or a full state of ice pieces in an ice detection operation.

In the output shaft 33, an outer peripheral face of a portion which is protruded from the cam gear 32 to one side "X1" in the first direction "X" is fitted to a friction member 36 in a cylindrical tube shape. The friction member 36 is turnable together with the output shaft 33 by a frictional force with the output shaft 33. An end part on one side "X1" in the first direction "X" of the friction member 36 is formed with a groove 361 in a cut-out shape, and a protruded part (not shown) formed in the second case member 72 is capable of abutting with both ends of the groove 361. Therefore, the friction member 36 is turnable only in a region until the protruded part of the second case member 72 is abutted with one of both ends of the groove 361 and, after turning of the friction member 36 is prevented, only the output shaft 33 is turned around the axial line "L0".

An outer peripheral face of the friction member 36 is provided with a protruded part (not shown) for preventing turning of an ice detection shaft 31 described below. The protruded part is not engaged with an engaging protruded part (not shown) of the ice detection shaft 31 when the cam gear 32 is turned to a side of an ice separation position, and the protruded part is engaged with the engaging protruded part of the ice detection shaft 31 only when the cam gear 32 is turned to a side of an ice making position and turning of the ice detection shaft 31 is prevented. When turning of the ice detection shaft 31 is prevented, a switch pressing operation prevention part 31d formed on the ice detection shaft 31 is prevented from entering into a turnable range of the switch pressing lever 372 and thus, the pressing type switch 371 is freely capable of turning on or off. Therefore, the pressing type switch 371 is always turned on at a midway position when the ice detection lever 6 is returned from the ice separation position to the ice making position.

A face of the cam gear 32 facing the second case member 72 is provided with a switch pressing lever cam face (not shown) for driving the switch pressing lever, and an ice detection shaft cam face (not shown) for driving the ice detection shaft 31. The ice detection shaft 31 is connected with the ice detection lever 6. The ice detection shaft 31 is provided with a sliding part 31a which slides on the ice detection shaft cam face of the cam gear 32 on one end "L1a" side in the axial line "L1" direction. The ice detection shaft 31 is turned depending on a turning angle of the cam gear 32 to move the ice detection lever 6. An outer peripheral face of the ice detection shaft 31 is provided, from one end "L1a" side to the other end "L1b" side in the axial line "L1" direction, with a case received part 31g, the sliding part 31a, a spring engaging part (not shown), a guiding protruded part 31h, a switch pressing operation prevention part 31d, a thrust coming-off prevention protruded part 31e, and a lever connecting part 31f so as to be protruded to an outer side in a radial direction. The protruded part (not shown) engaging with the friction member 36 is formed on an opposite side to the sliding part 31a in a circumferential direction.

The ice detection mechanism 11 includes an urging member 38 structured to urge the ice detection shaft 31 around the axial line "L1" in a direction that the sliding part 31a is pressed against the ice detection shaft cam face side. In this embodiment, the urging member 38 is structured with a compression coil spring 380 which is disposed on the bottom plate part 721 of the second case member 72.

In the ice detection mechanism 11 structured as described above, a movement of the ice detection shaft 31 operated along the ice detection shaft cam face is transmitted to the ice detection lever 6, and a signal is outputted from the pressing type switch 371 corresponding to turning of the ice detection shaft 31. Therefore, it can be determined whether ice pieces are insufficient or not and thus an ice separating operation can be performed at an appropriate timing.

(Structure of Circuit Board Arrangement Chamber 706)

Figure 8:
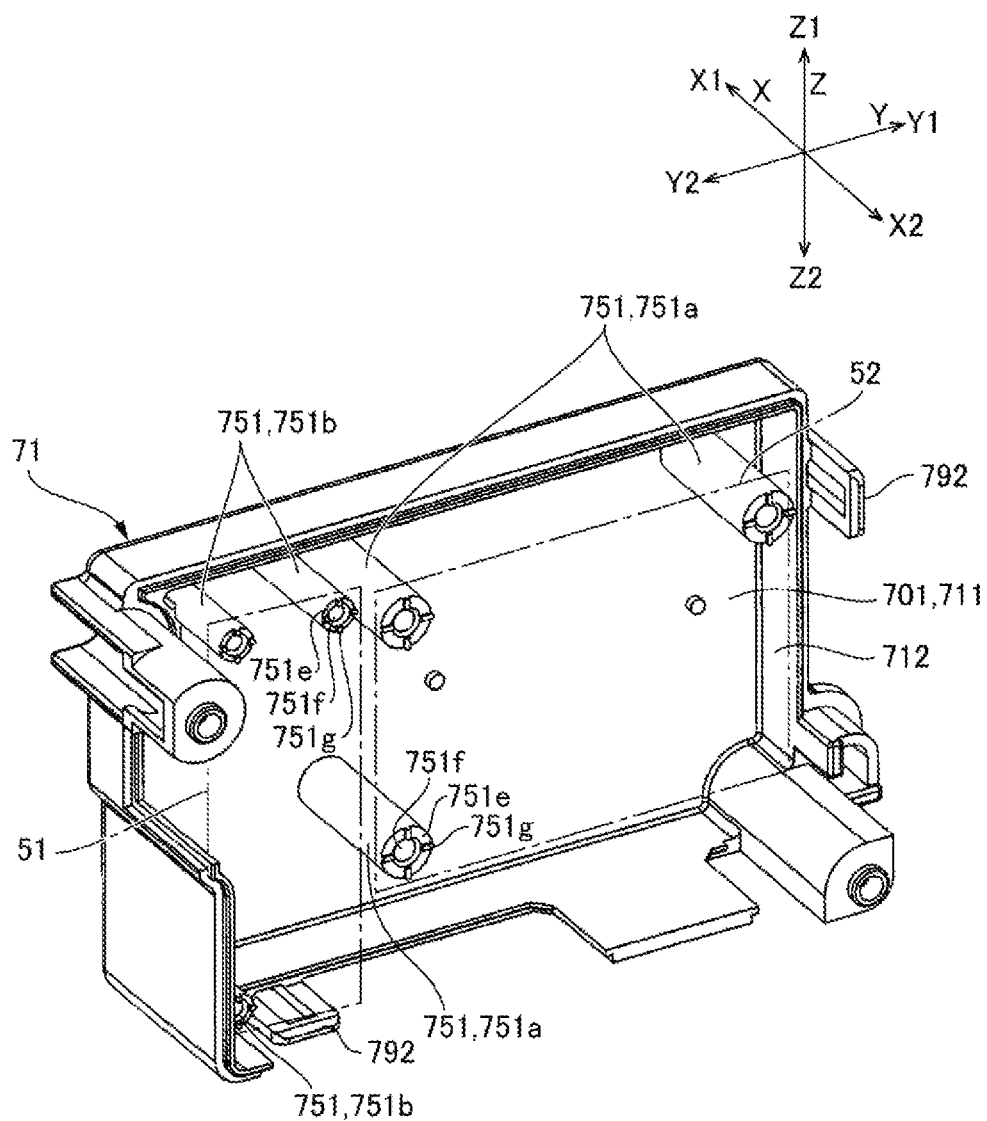
FIG. 8 is a perspective view showing a first case member in FIG. 5 which is viewed from a side of an ice tray.
Figure 9:
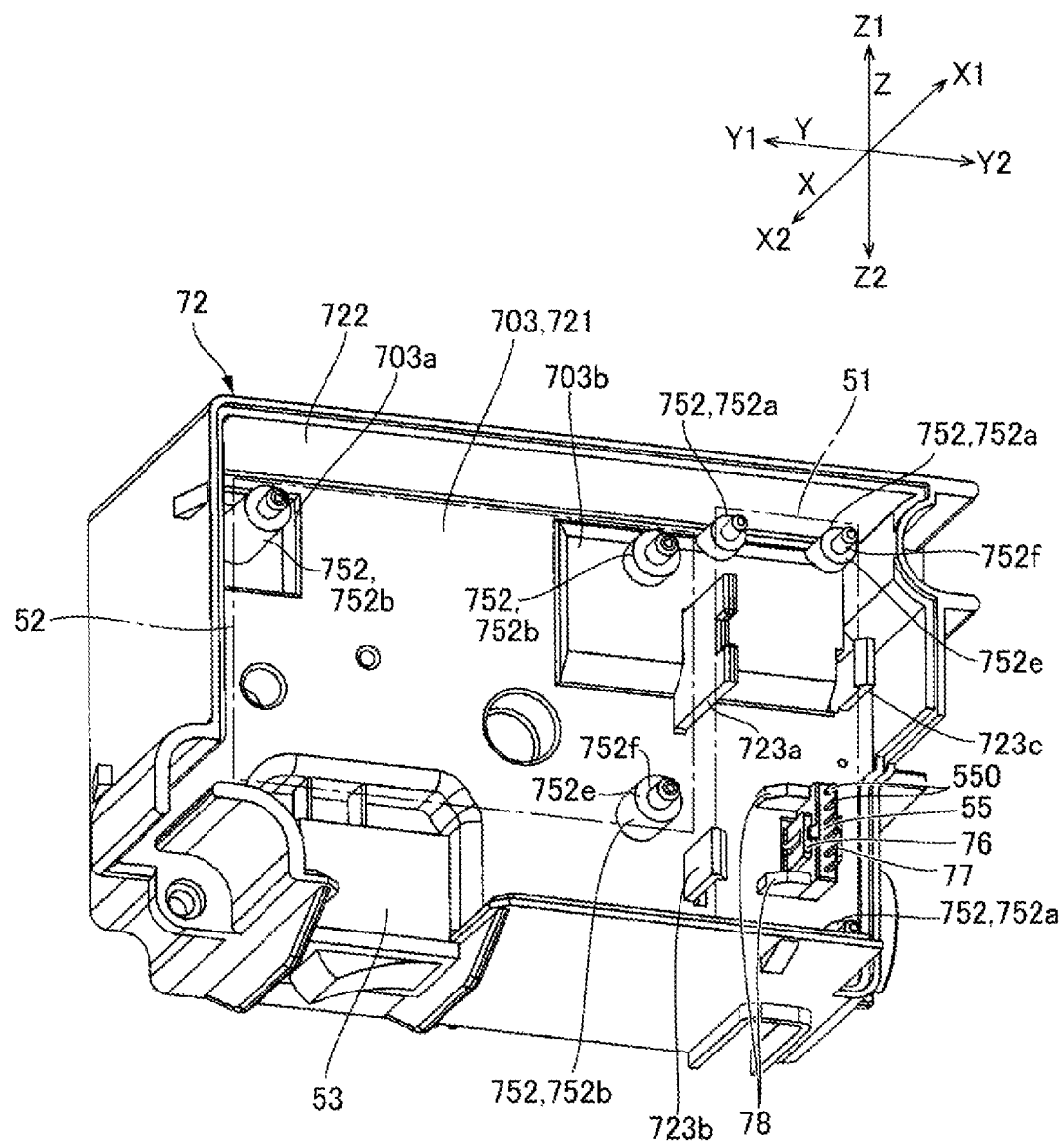
FIG. 9 is a perspective view showing a second case member in FIG. 5 which is viewed from a side of the first case member.
Figure 10:
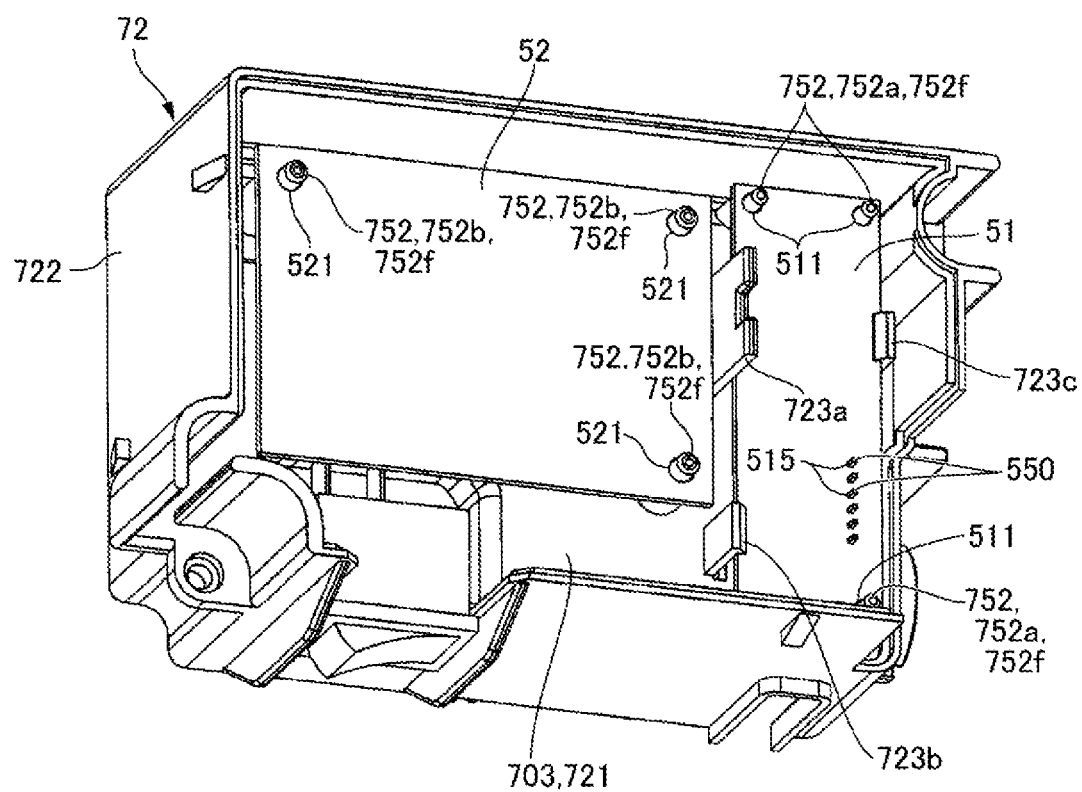
FIG. 10 is a perspective view showing the second case member in FIG. 5 together with a circuit board which is viewed from a side of the first case member.

FIG. 8 is a perspective view showing the first case member 71 in FIG. 5 which is viewed from a side of the ice tray 2. FIG. 9 is a perspective view showing the second case member 72 in FIG. 5 which is viewed from a side of the first case member 71. FIG. 10 is a perspective view showing the second case member 72 in FIG. 5 together with a circuit board which is viewed from a side of the first case member 71.

As shown in FIG. 8, the first case member 71 is provided with a body part 712 which is bent from an outer side edge of the bottom plate part 711 (first end plate part 701) to the other side "X2" in the first direction "X". The body part 712 is overlapped with the rectangular tube-shaped body part 722 of the second case member 72. In this embodiment, as shown in FIG. 4, the case 7 is provided with a plurality of support posts 75 in a round bar shape which support bottom plate parts 711 and 721 between the first end plate part 701 (bottom plate part 711 of the first case member 71) and the partition member 703 (bottom plate part 721 of the second case member 72). In this embodiment, each of the plurality of the support posts 75 includes a first pillar shaped part 751 in a round bar shape which is protruded from the first end plate part 701 toward the partition member 703, and a second pillar shaped part 752 in a round bar shape which is protruded from the partition member 703 toward the first pillar shaped part 751 of the first end plate part 701.

More specifically, as shown in FIG. 8, totaled six (6) first pillar shaped parts 751 are integrally molded and protruded from the first end plate part 701 toward the other side "X2" in the first direction "X" from positions separated from the body part 712 in the first end plate part 701. Some of the first pillar shaped parts 751 are provided in an outer peripheral part of the first end plate part 701 and, especially, some of the first pillar shaped parts 751 are separately provided from the body part 712 at corner positions of the first end plate part 701 in a rectangular shape. When the first pillar shaped parts 751 are integrally molded with the first end plate part 701, the strength of the first end plate part 701 can be reinforced in a simple structure. Further, as shown in FIG. 9, totaled six (6) second pillar shaped parts 752 are integrally molded and protruded toward one side "X1" in the first direction "X" from positions in the partition member 703 overlapping with the respective six first pillar shaped parts 751 in the first direction "X". Therefore, when the first case member 71 and the second case member 72 are overlapped with each other, the support posts 75 are structured by the first pillar shaped parts 751 and the second pillar shaped parts 752. Further, a circuit board (first circuit board 51 and second circuit board 52) is supported between the first pillar shaped part 751 and the second pillar shaped part 752.

In this embodiment, as shown in FIG. 4, some of the plurality of the support posts 75 support the second circuit board 52 in a state that the second circuit board 52 is abutted with and sandwiched between the first pillar shaped part 751 and the second pillar shaped part 752. Further, although not shown in FIG. 4, some other support posts 75 support the first circuit board 51 in a state that the first circuit board 51 is abutted with and sandwiched between the first pillar shaped part 751 and the second pillar shaped part 752. Therefore, each of the plurality of the support posts 75 is structured of the first pillar shaped part 751 and the second pillar shaped part 752 as one support post 75 and the respective support posts 75 are connected with each other through the first circuit board 51 and the second circuit board 52. Accordingly, the strength of the first end plate part 701 where the first pillar shaped parts 751 are formed can be also increased through the first circuit board 51 and the second circuit board 52.

More specifically, as shown in FIG. 8, in totaled six (6) first pillar shaped parts 751 in the first end plate part 701, three first pillar shaped parts 751a disposed so as to form a triangle in a region where the second circuit board 52 is disposed are structured so that its outer diameter is larger than that of other first pillar shaped parts 751b, and a hole 751f is opened at a tip end part 751e. Further, the tip end part 751e of the first pillar shaped part 751a is formed to be a circular ring-shaped face, and the tip end part 751e is radially formed with a plurality of projection parts 751g around the hole 751f. Further, in other three first pillar shaped parts 751b of the totaled six (6) first pillar shaped parts 751 which are disposed to form a triangle in a region where the first circuit board 51 is disposed, similarly to the first pillar shaped parts 751a, a hole 751f is opened at the tip end part 751e. The tip end part 751e of the first pillar shaped part 751b is, similarly to the tip end part 751e of the first pillar shaped part 751a, also formed in a circular ring-shaped face, and the tip end part 751e is radially formed with a plurality of projection parts 751g around the hole 751f. In this embodiment, the six first pillar shaped parts 751 are structured so that heights of the respective tip end parts 751e are equal to each other and that heights of the respective projection parts 751g are equal to each other.

On the other hand, as shown in FIG. 9, three second pillar shaped parts 752a of totaled six (6) second pillar shaped parts 752 in the partition member 703 which are disposed to form a triangle in a region where the second circuit board 52 is disposed are structured so that their outer diameters are larger than those of other second pillar shaped parts 752b, and a shaft-shaped protruded part 752f is protruded from a tip end part 752e. Further, other three second pillar shaped parts 752b of totaled six (6) second pillar shaped parts 752 which are disposed to form a triangle in a region where the first circuit board 52 is disposed are, similarly to the first pillar shaped part 751a, structured so that a shaft-shaped protruded part 752f is protruded from the tip end part 752e. Therefore, when the first case member 71 and the second case member 72 are overlapped with each other, the protruded parts 752f of the second pillar shaped parts 752 are fitted to the holes 751f of the first pillar shaped parts 751. In the partition member 703, a partition plate 723a and a plate-shaped hook 723b are formed between regions where the first circuit board 51 and the second circuit board 52 are disposed, and a hook 723c is formed at a position facing the partition plate 723a on the other side in the second direction "Y". The partition member 703 is formed with a recessed part 703a and a protruded part 703b. However, heights of the tip end parts 752e of the six second pillar shaped parts 752 are the same as each other. A protruding dimension of the protruded part 752f is larger than that of the projection part 751g that formed in the first pillar shaped part 751.

In this embodiment, as shown in FIG. 10, the first circuit board 51 is formed with opening parts 511 through which the protruded parts 752f of the second pillar shaped parts 752a are penetrated, and the second circuit board 52 is formed with opening parts 521 through which the protruded parts 752f of the second pillar shaped parts 752b are penetrated. Therefore, when the first case member 71 and the second case member 72 are overlapped with each other, the protruded parts 752f of the second pillar shaped parts 752b are penetrated through the opening parts 511 and 521 of the first circuit board 51 and the second circuit board 52 and are fitted into the holes 751f of the first pillar shaped parts 751. As a result, the first circuit board 51 and the second circuit board 52 are respectively sandwiched between the tip end parts 751e of the first pillar shaped parts 751 and the tip end parts 752e of the second pillar shaped parts 752, and are supported in a separated state from the first end plate part 701 and the partition member 703.

In this embodiment, the projection parts 751g are formed on the tip end part 751e of the first pillar shaped part 751 and, when the first case member 71 and the second case member 72 are overlapped with each other, the projection parts 751g formed on the tip end part 751e of the first pillar shaped part 751 are abutted with the tip end part 752e of the second pillar shaped part 752 before the body part 712 of the first case member 71 and the body part 722 of the second case member 72 are abutted with each other. Therefore, variations of the height dimensions of the first pillar shaped part 751 and the second pillar shaped part 752 can be absorbed by abutting portions in the first circuit board 51 and the second circuit board 52 with the projection parts 751g of the first pillar shaped part 751 and, alternatively by a crushing extent of the projection parts 751g. Accordingly, the body part 712 of the first case member 71 and the body part 722 of the second case member 72 are abutted with each other and thus the first case member 71 and the second case member 72 can be positioned surely. Further, the first circuit board 51 and the second circuit board 52 can be prevented from being inclined. In this embodiment, variations of the height dimensions of the first pillar shaped part 751 and the second pillar shaped part 752 are absorbed by the crushing extent of a portion where the projection parts 751g of the first pillar shaped part 751 are abutted in the first circuit board 51 and the second circuit board 52.

In this embodiment, the partition plate 723a and two hooks 723b and 723c are formed in the partition member 703 between the regions where the first circuit board 51 and the second circuit board 52 are disposed. Two edges of the first circuit board 51 facing in the second direction "Y" are respectively supported by the hooks 723b and 723c from one side "X1" in the first direction "X". Therefore, when the first case member 71 and the second case member 72 are to be overlapped and connected with each other, the first circuit board 51 can be temporarily attached to the partition member 703 by the hooks 723b and 723c in a state that the protruded parts 752f of the second pillar shaped parts 752 formed in the partition member 703 are fitted to the opening parts 511 and 521 of the first circuit board 51 and the second circuit board 52.

(Structure of Terminal Holder 55 and the Like)

Figure 11:
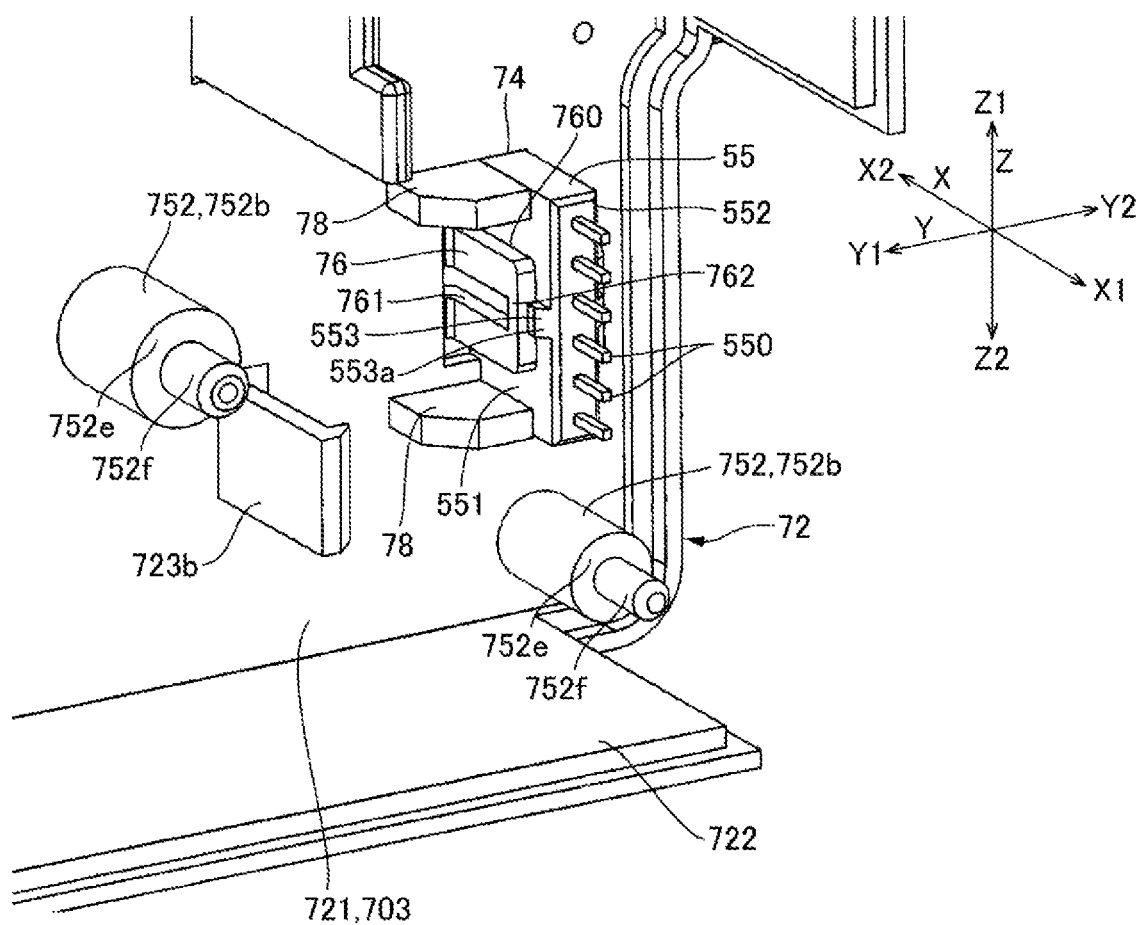
FIG. 11 is a perspective view showing a state that a terminal holder is disposed at a position overlapping with a first circuit board shown in FIG. 10 which is viewed from one side in a second direction.
Figure 12:
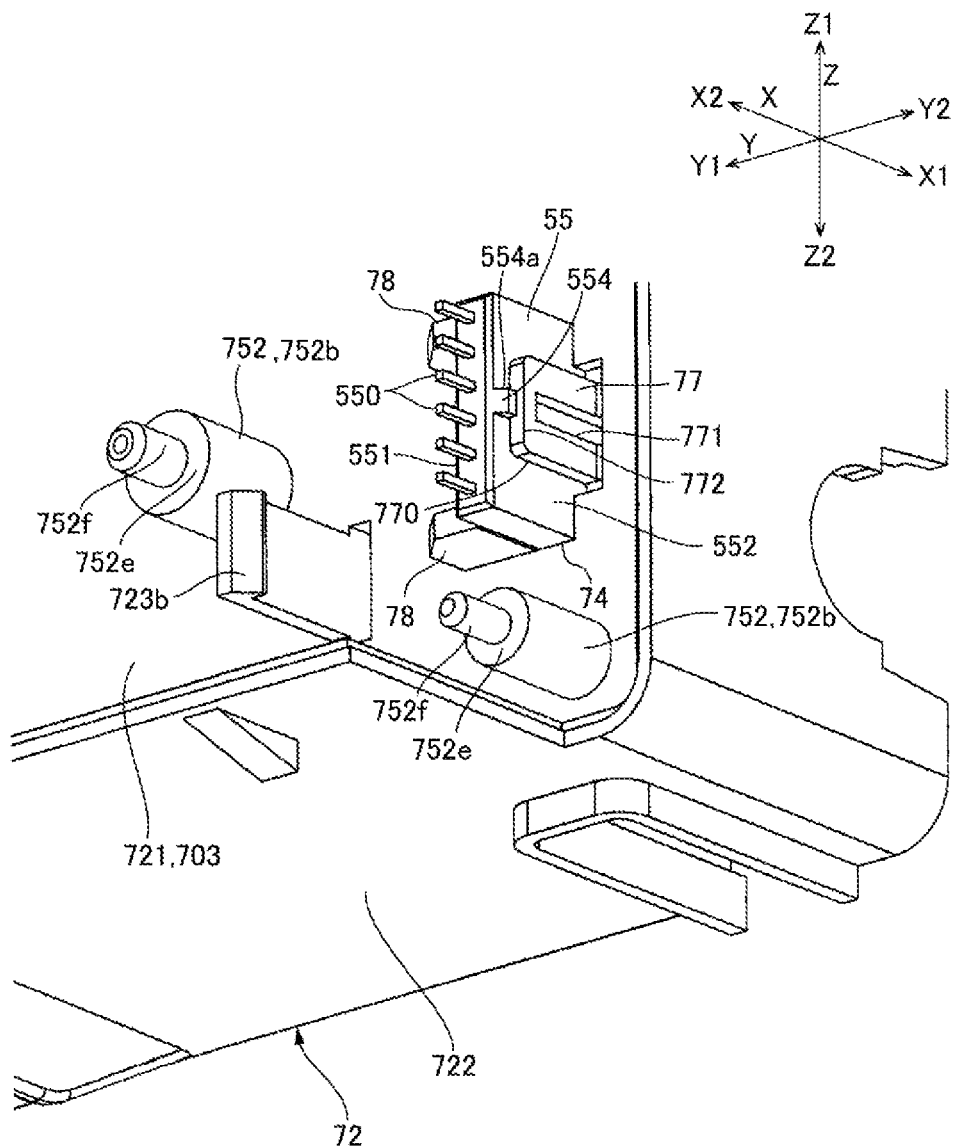
FIG. 12 is a perspective view showing a state that a terminal holder is disposed at a position overlapping with a first circuit board shown in FIG. 10 which is viewed from the other side in a second direction.
Figure 13:
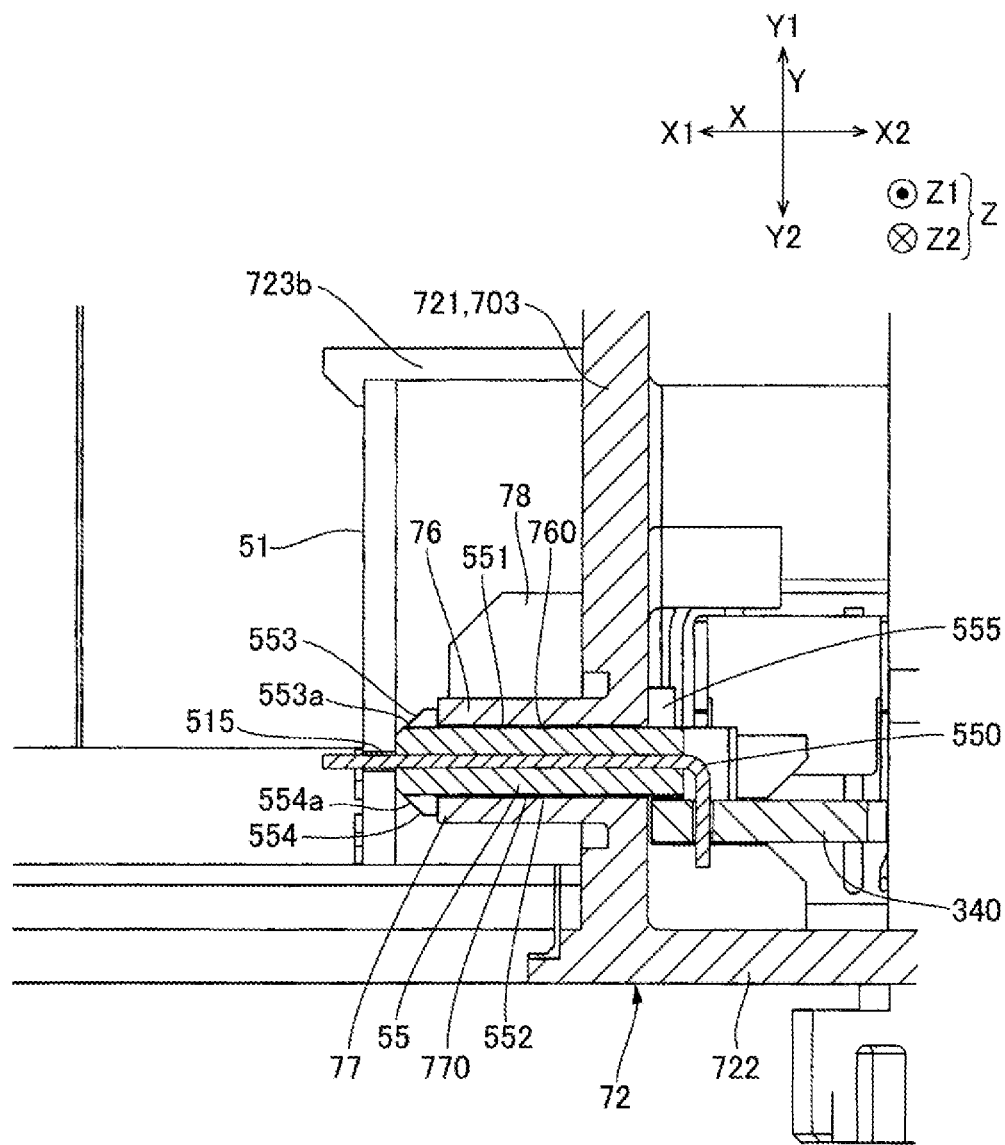
FIG. 13 is an "XY" cross-sectional view showing a portion where a terminal holder shown in FIG. 9 is disposed.
Figure 14:
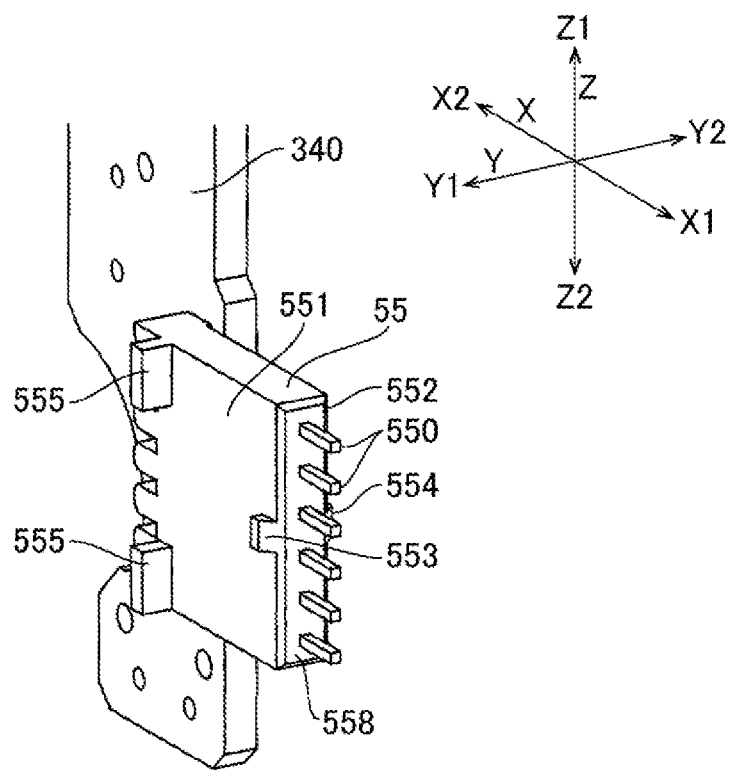
Figure 15:
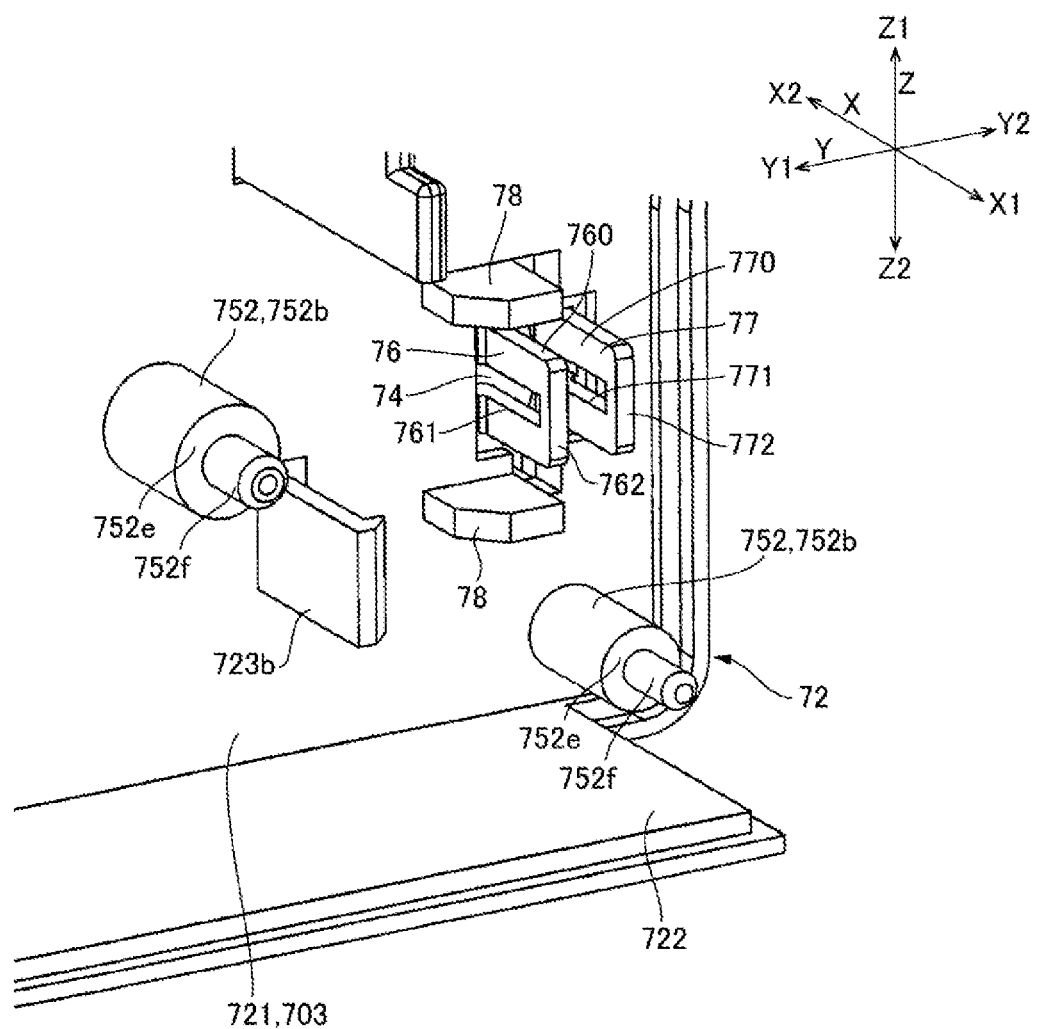
FIG. 15 is a perspective view showing a holder support part and the like shown in FIG. 11.
Figure 16:
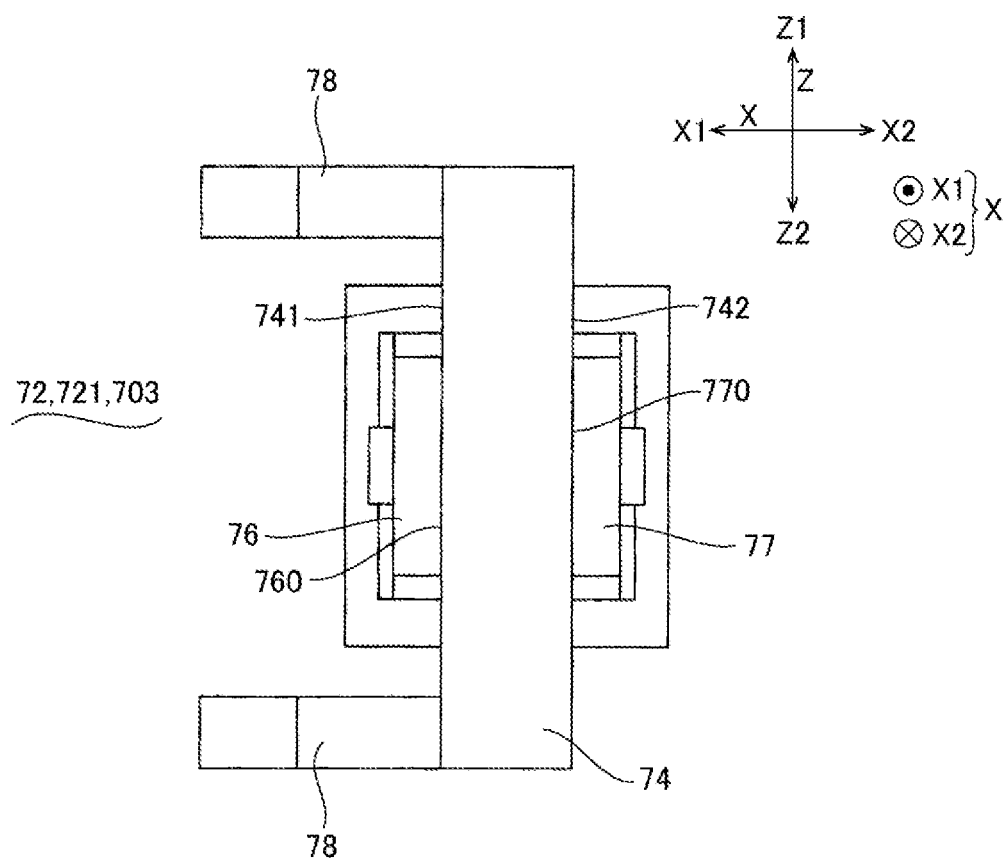
FIG. 16 is a plan view showing a holder support part and the like shown in FIG. 11.
Figure 17:
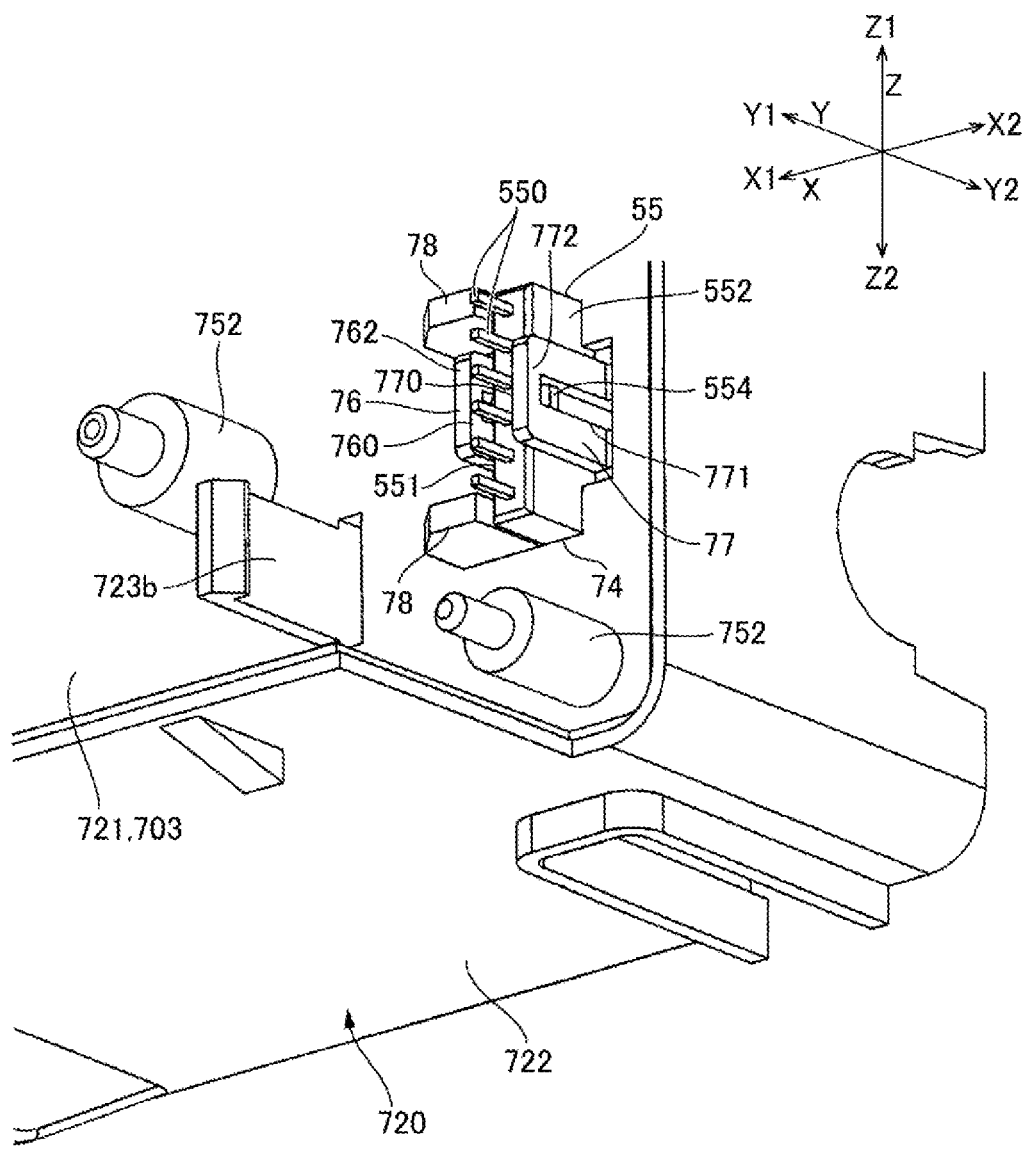
FIG. 17 is an explanatory view showing a state that a terminal holder shown in FIG. 11 is inserted between holder support parts.

FIG. 11 is a perspective view showing a state that a terminal holder 55 is disposed at a position overlapping with the first circuit board 51 shown in FIG. 10 which is viewed from one side "Y1" in the second direction "Y". FIG. 12 is a perspective view showing a state that the terminal holder 55 is disposed at a position overlapping with the first circuit board 51 shown in FIG. 10 which is viewed from the other side "Y2" in the second direction "Y". FIG. 13 is the "XY" cross-sectional view showing a portion where the terminal holder 55 shown in FIG. 9 is disposed. FIG. 14 is a perspective view showing the terminal holder 55 in FIG. 11 and the like. FIG. 15 is a perspective view showing holder support parts 78 and the like shown in FIG. 11. FIG. 16 is a plan view showing the holder support parts 78 and the like shown in FIG. 11. FIG. 17 is an explanatory view showing a state that the terminal holder 55 shown in FIG. 11 is inserted between the holder support parts 78.

As shown in FIGS. 9, 10, 11 and 12, in this embodiment, in order to electrically connect the first circuit board 51 and the like with the motor circuit board 340 shown in FIG. 7 through the partition member 703, one ends of a plurality of terminals 550 are electrically connected with the first circuit board 51 in a state that the one ends of the plurality of the terminals 550 held by the terminal holder 55 in a rectangular prism shape are penetrated through the terminal holes 515 of the first circuit board 51 in the vicinity of a corner of the partition member 703 on the other side "Y2" in the second direction "Y" and on the other side "Z2" in the third direction "Z".

As shown in FIGS. 12, 13, and 14 the terminal holder 55 is fixed to the motor circuit board 340, and the other ends of the plurality of the terminals 550 are electrically connected with the motor circuit board 340. In this embodiment, the terminal holder 55 is provided with a first side face 551 on one side "Y1" in the second direction "Y", a second side face 552 on the other side "Y2" in the second direction "Y", and an end face 558 on one side "X1" in the first direction "X" from which one ends of the terminals 550 are protruded.

Further, an end part on the end face 558 side of the first side face 551 of the terminal holder 55 is formed with a first engaging protruded part 553 which is protruded from a substantially center portion in the third direction "Z" to one side "Y1" in the second direction "Y". An end part on the end face 558 side of the second side face 552 is formed with a second engaging protruded part 554 which is protruded from a substantially center portion in the third direction "Z" to the other side "Y2" in the second direction "Y". In addition, an end part on an opposite side to the end face 558 of the first side face 551 of the terminal holder 55 is protruded with stopper protruded parts 555 from respective both end parts in the third direction "Z".

As shown in FIGS. 11 and 13, an end face on one side "X1" in the first direction "X" of the first engaging protruded part 553 is formed in an inclined part 553a which is obliquely inclined so that a tip end side in a protruding direction of the first engaging protruded part 553 is located on the other side "X2" in the first direction "X" with respect to its root portion on the first side face 551 side. Further, as shown in FIGS. 11 and 13, an end face on one side "X1" in the first direction "X" of the second engaging protruded part 554 is formed in an inclined part 554a which is obliquely inclined so that a tip end side in a protruding direction of the second engaging protruded part 554 is located on the other side "X2" in the first direction "X" with respect to its root portion on the second side face 552 side.

In order to dispose the terminal holder 55 structured as described above, the partition member 703 is formed with a penetration part 74 whose longitudinal direction is directed in the third direction "Z", and the terminal holder 55 is inserted into the penetration part 74 from the other side "X2" toward one side "X1" in the first direction "X".

The partition member 703 is provided with a first holder support part 76 in a plate shape, which is stood up from a first edge 741 on one side "Y1" in the second direction "Y" of the penetration part 74 toward one side "X1" in the first direction "X", and a second holder support part 77 in a plate shape which is stood up from a second edge 742 on the other side "Y2" in the second direction "Y" of the penetration part 74 toward one side "X1" in the first direction "X". The first holder support part 76 and the second holder support part 77 are disposed so that their plate thickness directions are directed toward the second direction "Y". Therefore, the first holder support part 76 is abutted with elasticity with the first side face 551 of the terminal holder 55 with an inner face 760 located on the penetration part 74 side in a plate thickness direction as a support face. Further, the second holder support part 77 is abutted with elasticity with the second side face 552 of the terminal holder 55 with an inner face 770 located on the penetration part 74 side in a plate thickness direction as a support face. Therefore, both faces in the second direction "Y" of the terminal holder 55 are respectively supported with elasticity by the first holder support part 76 and the second holder support part 77.

In this state, the first engaging protruded part 553 is engaged with a tip end part 762 of the first holder support part 76 from one side "X1" in the first direction, and the second engaging protruded part 554 is engaged with a tip end part 772 of the second holder support part 77 from one side "X1" in the first direction. Further, the stopper protruded parts 555 of the terminal holder 55 are engaged with the partition member 703 from the other side "X2" in the first direction "X".

In this embodiment, a protruding height from the first side face 551 of the first engaging protruded part 553 is smaller than a thickness of the first holder support part 76 in a protruding direction of the first engaging protruded part 553. Further, a protruding height from the second side face 552 of the second engaging protruded part 554 is smaller than a thickness of the second holder support part 77 in a protruding direction of the second engaging protruded part 554. Further, the inner face 760 of the first holder support part 76 and the inner face 770 of the second holder support part 77 are formed to be perpendicular faces to the partition member 703.

In this embodiment, the first holder support part 76 is formed with a first guide groove 761 from an end part on the other side "X2" to a midway position toward one side "X1" in the first direction "X". Further, the second holder support part 77 is formed with a second guide groove 771 from an end part on the other side "X2" to a midway position toward one side "X1" in the first direction "X". The first guide groove 761 and the second guide groove 771 guide the first engaging protruded part 553 and the second engaging protruded part 554 as shown in FIG. 17 when the terminal holder 55 is inserted into the penetration part 74 from the other side "X2" toward one side "X1" in the first direction "X".

When the terminal holder 55 is inserted into the penetration part 74 of the partition member 703 structured as described above from the other side "X2" toward one side "X1" in the first direction "X", the first engaging protruded part 553 and the second engaging protruded part 554 are guided by the first guide groove 761 and the second guide groove 771 of the first holder support part 76 and the second holder support part 77, and the terminal holder 55 is inserted to one side "X1" in the first direction "X". Next, when the first engaging protruded part 553 and the second engaging protruded part 554 are abutted with the tip end parts 762 and 772 of the first holder support part 76 and the second holder support part 77, the first engaging protruded part 553 and the second engaging protruded part 554 are passed beyond the first guide groove 761 and the second guide groove 771 while resiliently bending the first holder support part 76 and the second holder support part 77 toward outer sides, and the first engaging protruded part 553 and the second engaging protruded part 554 are engaged with the tip end part 762 of the first holder support part 76 and the tip end part 772 of the second holder support part 77 from one side "X1" in the first direction. In this case, the stopper protruded parts 555 of the terminal holder 55 are engaged with the partition member 703 from the other side "X2" in the first direction "X" and thus the terminal holder 55 is not moved any more to one side "X1" in the first direction "X". Therefore, even when another structure is not adopted, an inserting depth of the terminal holder 55 to the penetration part 74 can be adjusted and the terminal holder 55 is held by the partition member 703.

In this embodiment, the inner face 760 of the first holder support part 76 and the inner face 770 of the second holder support part 77 are perpendicular faces to the partition member 703. Therefore, the terminal holder 55 can be easily inserted between the first holder support part 76 and the second holder support part 77 through the penetration part 74 and, in addition, the terminal holder 55 can be appropriately supported by the first holder support part 76 and the second holder support part 77.

Further, a protruding height from the first side face 551 of the first engaging protruded part 553 is smaller than a thickness of the first holder support part 76 in a protruding direction of the first engaging protruded part 553, and a protruding height from the second side face 552 of the second engaging protruded part 554 is smaller than a thickness of the second holder support part 77 in a protruding direction of the second engaging protruded part 554. Further, the inclined parts 553a and 554a are formed on the end faces on one side "X1" in the first direction "X" of the first engaging protruded part 553 and the second engaging protruded part 554. Therefore, when the first engaging protruded part 553 and the second engaging protruded part 554 are passed beyond the first guide groove 761 and the second guide groove 771 while the first holder support part 76 and the second holder support part 77 are resiliently bent toward outer sides, a situation is hard to be occurred that the first engaging protruded part 553 and the second engaging protruded part 554 are caught by the end parts of the first guide groove 761 and the second guide groove 771. Accordingly, the first engaging protruded part 553 and the second engaging protruded part 554 can be easily engaged with the tip end part 762 of the first holder support part 76 and the tip end part 772 of the second holder support part 77. Further, the abutting portions of the first engaging protruded part 553 and the second engaging protruded part 554 with the tip end part 762 of the first holder support part 76 and the tip end part 772 of the second holder support part 77 are formed in faces and thus the first engaging protruded part 553 and the second engaging protruded part 554 are hard to be disengaged from the tip end part 762 of the first holder support part 76 and the tip end part 772 of the second holder support part 77.

Further, the first holder support part 76 and the second holder support part 77 are disposed at a center in an extending direction of the first edge 741 and the second edge 742 of the penetration part 74, and the third holder support parts 78 in a plate shape are protruded at both end sides in the extending direction of the first edge 741 or the second edge 742 so that their plate thickness directions are directed in the extending direction of the first edge 741 or the second edge 742. The third holder support part 78 is structured so as to be unable to elastically deform in the direction that the first side face 551 and the second side face 552 of the terminal holder 55 are faced each other. In this embodiment, the third holder support part 78 is protruded from both end sides in the extending direction of the first edge 741, and the third holder support parts 78 support the first side face 551 of the terminal holder 55. According to this structure, the third holder support parts 78 surely support the terminal holder 55 from a direction perpendicular to the plate thickness direction and thus a situation is hard to be occurred that the terminal holder 55 is inclined.

(Operation)

In an ice making device 1 in this embodiment, in an ice making step, water is supplied to an ice tray 2 horizontally disposed so that water storage recessed parts 20 face to an upper side through a water supply pipe (not shown) and water is filled in the water storage recessed parts 20. After that, the water filled in the ice tray 2 is frozen by a cold air supplied from a cooling part (not shown). Whether an ice making has been completed or not is determined according to whether or not a temperature of the ice tray 2 has reached a predetermined temperature or lower based on a temperature sensor 8 (thermistor 80) attached to the ice tray 2.

When ice making has been completed, an ice quantity in an ice storage container (not shown) arranged on a lower side with respect to the ice tray 2 is detected by an ice detection lever 6. Specifically, the ice detection lever 6 is driven and moved downward by a drive unit 3. In this case, when the ice detection lever 6 has been moved down to a predetermined position, it is judged that the ice quantity in the ice storage container is insufficient. On the other hand, in a case that the ice detection lever 6 is abutted with an ice piece in the ice storage container before moved down to the predetermined position, it is judged that the ice quantity in the ice storage container is full. In a case that the ice quantity in the ice storage container is full, after waited for a predetermined time period, the ice quantity in the ice storage container will be detected by the ice detection lever 6 again.

When an ice quantity in the ice storage container is insufficient, an ice separating operation of the ice tray 2 is performed. Specifically, an output shaft 33 of the drive unit 3 is driven and turned and the ice tray 2 is turned in a counterclockwise direction "CCW" with an axial line "L0" as a center. When the ice tray 2 is turned around by a predetermined turning angle of 90° or more (for example, 120°) from a horizontally disposed first position, a turning restriction part 29 of the ice tray 2 is abutted with a frame 4. In this state, further turning of the ice tray 2 is restricted and thus the ice tray 2 is twisted and deformed. As a result, ice pieces in the ice tray 2 are separated from the ice tray 2 and dropped into the ice storage container arranged on a lower side with respect to the ice tray 2.

After that, the drive unit 3 turns the ice tray 2 in a reverse direction, i.e., in a clockwise direction "CW" so that the water storage recessed parts 20 face to an upper side with the axial line "L0" as a center, and the above-mentioned operations are repeated.

Principal Effects in this Embodiment

As described above, in this embodiment, the circuit board (first circuit board 51 and second circuit board 52) is disposed in the circuit board arrangement chamber 706 provided between the first end plate part 701 and the partition member 703, and the drive mechanism 15 is disposed in the drive chamber 707 provided between the second end plate part 702 and the partition member 703. Therefore, the first circuit board 51 and the second circuit board 52 are not disposed in the drive chamber 707 and thus, grease applied to the drive mechanism 15 in the drive chamber 707 and water entered into the drive chamber 707 are hard to be stuck to the first circuit board 51 and the second circuit board 52. Further, the first circuit board 51 and the second circuit board 52 are not disposed in the drive chamber 707 and thus the drive chamber 707 has some spare space. Therefore, the drive chamber 707 (partition member 703 and second end plate part 702) can be reinforced by a rib or the like. Further, the circuit board arrangement chamber 706 (first end plate part 701 and partition member 703) is reinforced by the support post 75. Therefore, the strength of the case 7 of the drive unit 3 can be increased and thus the case 7 can be provided with sufficient strength which is capable of withstanding a reaction force when an ice separating operation is performed. Especially, in this embodiment, the ice tray 2 is performed with a reversing operation and a twisting operation interlocked with the reversing operation by the drive mechanism 15 and thus a large reaction force is applied to the drive unit 3 by the ice tray 2 when an ice separating operation is performed. However, according to this embodiment, the case 7 is capable of withstanding the reaction force.

Further, each of a plurality of the support posts 75 is provided with the first pillar shaped part 751 which is protruded from the first end plate part 701 toward the partition member 703, and the second pillar shaped part 752 which is protruded from the partition member 703 toward the first end plate part 701 and is abutted with the first pillar shaped part 751, and the circuit board (first circuit board 51 and second circuit board 52) is supported between the first pillar shaped part 751 and the second pillar shaped part 752. Therefore, the first circuit board 51 and the second circuit board 52 are separated from the first end plate part 701 and the partition member 703 and thus restrictions for height and the like of electronic components mounted on the first circuit board 51 and the second circuit board 52 can be reduced. Further, the protruded part 752*f* of the second pillar shaped part 752 is fitted into the hole 751*f* of the first pillar shaped part 751. Therefore, the first end plate part 701 and the partition member 703 can be surely positioned in a direction intersecting the axial line "L0" and the strength of the case 7 in the direction intersecting the axial line "L0" can be increased.

Further, variations of height dimensions of the first pillar shaped part 751 and the second pillar shaped part 752 can be absorbed by a crushing extent of the projection part 751*g*. Therefore, the first case member 71 and the second case member 72 can be appropriately overlapped with each other and the circuit board (first circuit board 51 and second circuit board 52) can be supported appropriately. Further, each of the first circuit board 51 and the second circuit board 52 is supported by three support posts 75 and thus, even if the height dimensions of the first pillar shaped part 751 and the second pillar shaped part 752 are varied in the three support posts 75, each of the first circuit board 51 and the second circuit board 52 can be appropriately supported.

Further, in order to electrically connect the circuit board arrangement chamber 706 with the drive chamber 707 through the penetration part 74 of the partition member 703, the terminal holder 55 inserted into the penetration part 74 are supported from both sides by the first holder support part 76 and the second holder support part 77 which are stood up from the partition member 703. Further, the first holder support part 76 and the second holder support part 77 are formed with the first guide groove 761 and the second guide groove 771. Therefore, when the terminal holder 55 is inserted into the penetration part 74, the first engaging protruded part 553 of the terminal holder 55 is guided by the first guide groove 761, and the second engaging protruded part 554 of the terminal holder 55 is guided by the second guide groove 771. Further, after the first engaging protruded part 553 and the second engaging protruded part 554 have passed beyond the first guide groove 761 and the second guide groove 771 by resiliently bending the first holder support part 76 and the second holder support part 77 in plate thickness directions, the first engaging protruded part 553 and the second engaging protruded part 554 are engaged with the first holder support part 76 and the second holder support part 77 from one side "X1" in the first direction "X". Therefore, the terminal holder 55 can be easily arranged in a state that the terminal holder 55 is prevented from coining off from the penetration part 74 to the other side "X2" in the first direction "X".

Further, the first holder support part 76 and the second holder support part 77 support the terminal holder 55 with elasticity. Therefore, when the terminals 550 held by the terminal holder 55 are to be electrically connected, the position of the terminal holder 55 can be shifted to some extent and thus the terminals 550 can be easily electrically connected. For example, in this embodiment, the terminals 550 are inserted into the terminal holes 515 of the first circuit board 51 and then the first circuit board 51 and the terminals 550 are electrically connected with each other by soldering. In this case, the terminals 550 can be inserted into the terminal holes 515 of the first circuit board 51 while finely adjusting the position of the terminal holder 55. Further, in this embodiment, after the terminals 550 are inserted into the terminal holes 515 of the first circuit board 51, the position of the first circuit board 51 is finely adjusted together with the terminal holder 55 and the first circuit board 51 can be temporarily attached to by the hooks 723*b* and 723*c*. Also in this case, when the first case member 71 and the second case member 72 are connected with each other, the first circuit board 51 is fixed between the first pillar shaped part 751*a* and the second pillar shaped part 752*a* and thus the position of the terminal holder 55 is not displaced.

Other Embodiments

Although the present invention has been shown and described with reference to a specific embodiment, various changes and modifications will be apparent to those skilled in the art from the teachings herein. For example, in the embodiment described above, the first pillar shaped part 751 and the second pillar shaped part 752 are abutted with each other to structure the support post 75, and the circuit board (first circuit board 51 and second circuit board 52) is supported between the first pillar shaped part 751 and the second pillar shaped part 752. However, it may be structured that the first pillar shaped part 751 and the second pillar shaped part 752 are respectively abutted with both faces of the circuit board (first circuit board 51 and second circuit board 52) without abutting the first pillar shaped part 751 with the second pillar shaped part 752 to support the circuit board, and the first pillar shaped part 751 and the second pillar shaped part 752 structure the support post 75. For example, in the embodiment described above, it may be structured that, in a state that the protruded part 752*f* of the second pillar shaped part 752 is inserted into the hole 751*f* of the first pillar shaped part 751, the protruded part 752*f* of the second pillar shaped part 752 is not contacted with an inner face of the hole 751*f* of the first pillar shaped part 751. Further, it may be structured that the tip end part 751*e* of the first pillar shaped part 751 and the tip end part 752*e* of the second pillar shaped part 752 are not formed with a hole and a protruded part, and that the circuit board (first circuit board 51 and second circuit board 52) are sandwiched between the tip end part 751*e* of the first pillar shaped part 751 and the tip end part 752*e* of the second pillar shaped part 752. Further, it may be structured that only one of the first pillar shaped part 751 and the second pillar shaped part 752 is formed and the support post 75 is structured of one pillar shaped part.

In the embodiment described above, the circuit board (first circuit board 51 and second circuit board 52) is supported between the first pillar shaped part 751 and the second pillar shaped part 752. However, it may be structured that the first pillar shaped part 751 and the second pillar shaped part 752 structure the support post 75 without supporting the circuit board (first circuit board 51 and second circuit board 52).

In the embodiment described above, the protruded part 752*f* is formed in the second pillar shaped part 752 and the hole 751*f* is formed in the first pillar shaped part 751. However, in order to hold the circuit board, it may be structured that the protruded part 752*f* is formed in the first pillar shaped part 751 and the hole 751*f* is formed in the second pillar shaped part 752.

In the embodiment described above, the first holder support part 76 and the second holder support part 77 are respectively formed with the first guide groove 761 and the second guide groove 771 for guiding the first engaging protruded part 553 and the second engaging protruded part 554. However, it may be structured that the second holder support part 77 is formed with no second engaging protruded part 554 and no second guide groove 771. In this case, it may be structured that the second holder support part 77 supports the terminal holder 55 with elasticity and, alternatively, the second holder support part 77 supports the terminal holder 55 without elasticity.

In the embodiment described above, when an ice separating operation is to be performed, the ice tray 2 is performed with a reversing operation and a twisting operation by the drive unit 3. However, the present invention may be applied to an ice making device 1 in which a scraping-out member for scraping ice pieces from the ice tray 2 is driven by the drive unit 3.

In the embodiment described above, a DC motor is used as a drive source. However, an AC motor, a capacitor motor or a stepping motor may be used. Further, a drive source other than a motor such as a solenoid may be adopted. Further, as liquid to be frozen, in addition to water, drink such as a juice may be adopted and an undrinkable liquid such as inspection reagent may be adopted. Further, a bimetal utilizing shape-memory alloy may be used, instead of using the thermistor 80, as a means for detecting whether ice pieces in an ice storage container have been frozen or not.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A drive unit for an ice making device comprising:
    a drive mechanism comprising a motor, a gear transmission mechanism and a cam gear;
    a circuit board structured to perform at least one of power feeding to and control for the drive mechanism; and
    a case in which the drive mechanism and the circuit board are disposed on an inner side;
    wherein the case comprises:
    a first end plate part which is located on one side in a thickness direction of the case;
    a second end plate part which faces the first end plate part on an other side in the thickness direction of the case; and
    a partition member which sections a space between the first end plate part and the second end plate part in the thickness direction of the case;
    wherein the circuit board is disposed in a circuit board arrangement chamber which is provided between the first end plate part and the partition member;
    wherein the drive mechanism is disposed in a drive chamber which is provided between the second end plate part and the partition member; and
    wherein a plurality of support posts is provided between the first end plate part and the partition member,
    wherein each of the plurality of the support posts comprises a first pillar shaped part protruded from the first end plate part toward the partition member and a second pillar shaped part protruded from the partition member toward the first pillar shaped part, and
    the circuit board is supported between the first pillar shaped part and the second pillar shaped part,
    wherein one of the first pillar shaped part and the second pillar shaped part comprises a protruded part which is protruded from a tip end part of the one of the first pillar shaped part and the second pillar shaped part, and
    an other of the first pillar shaped part and the second pillar shaped part comprises a hole which is opened in a tip end part of the other of the first pillar shaped part and the second pillar shaped part into which the protruded part is fitted,
    wherein the circuit board is supported between the first pillar shaped part and the second pillar shaped part in a state that the protruded part is penetrated through an opening part formed in the circuit board and is fitted into the hole.

2. The drive unit for the ice making device according to claim 1, wherein
    the other first pillar shaped part and second pillar shaped part comprises a plurality of projection parts on the tip end part, and
    the other first pillar shaped part and second pillar shaped part is contacted with the circuit board in a state that at least one of a portion of the circuit board where the plurality of the projection parts are abutted and the plurality of the projection parts is partly crushed.

3. The drive unit for the ice making device according to claim 1, wherein the circuit board comprises:
    a first circuit board supported by some of the plurality of the support posts; and
    a second circuit board supported by another some of the plurality of the support posts.

4. The drive unit for the ice making device according to claim 3, wherein
    the first circuit board is supported by three of the plurality of the support posts, and
    the second circuit board is supported by another three of the plurality of the support posts.

5. The drive unit for the ice making device according to claim 1, wherein
    the partition member comprises a penetration part which is penetrated through the partition member in the thickness direction of the case, and
    the drive chamber and the circuit board arrangement chamber are electrically connected with each other through the penetration part.

6. The drive unit for the ice making device according to claim 1, wherein the case comprises a first case member which structures the first end plate part, a second case member which structures the partition member, and a third case member which structures the second end plate part toward one side in the thickness direction of the case.

7. The drive unit for the ice making device according to claim 1, wherein
- a rotating force of the motor is transmitted to the gear transmission mechanism of the drive mechanism, and the rotating force of the motor is transmitted to the cam gear of the drive mechanism through the gear transmission mechanism,
- the cam gear comprises an output shaft which is protruded from the second end plate part to an outer side of the second end plate part and is connected with an ice tray, and
- when an ice separating operation of ice pieces of the ice tray is to be performed, the output shaft is turned by the motor and the ice tray is reversed.

8. The drive unit for the ice making device according to claim 7, wherein
- some of the first pillar shaped parts are provided in an outer peripheral part of the first end plate part.

9. An ice making device comprising:
- the drive unit defined in claim 1;
- an ice tray comprising a plurality of water storage recessed parts; and
- a frame which turnably supports the ice tray and on which the drive unit is mounted;
- wherein a reversing operation and a twisting operation interlocked with the reversing operation are performed on the ice tray by the drive mechanism.

10. The ice making device according to claim 9, wherein
- a rotating force of the motor is transmitted to the gear transmission mechanism of the drive mechanism, and the rotating force of the motor is transmitted to the cam gear of the drive mechanism through the gear transmission mechanism,
- the cam gear comprises an output shaft which is protruded from the second end plate part to an outer side of the second end plate part and is connected with the ice tray, and
- when an ice separating operation of ice pieces of the ice tray is to be performed, the output shaft is turned by the motor and the reversing operation and the twisting operation are performed on the ice tray.

11. The ice making device according to claim 10, wherein
- some of the first pillar shaped parts are provided in an outer peripheral part of the first end plate part.

12. The ice making device according to claim 11, wherein
- the other first pillar shaped part and second pillar shaped part comprises a plurality of projection parts on its the tip end part, and
- the other first pillar shaped part and second pillar shaped part is contacted with the circuit board in a state that at least one of a portion of the circuit board where the plurality of the projection parts are abutted and the plurality of the projection parts is partly crushed.

13. The ice making device according to claim 11, wherein
- the partition member comprises a penetration part which is penetrated through the partition member in the thickness direction of the case, and
- the drive chamber and the circuit board arrangement chamber are electrically connected with each other through the penetration part.

14. The ice making device according to claim 10, wherein
- the case comprises a first case member which structures the first end plate part, a second case member which structures the partition member, and a third case member which structures the second end plate part toward one side in the thickness direction of the case, and
- the first case member, the second case member and the third case member are connected with each other with a screw and are mounted on the frame.

\* \* \* \* \*